(12) United States Patent
Verfuerth et al.

(10) Patent No.: US 10,098,213 B2
(45) Date of Patent: *Oct. 9, 2018

(54) LIGHTING FIXTURE CONTROL SYSTEMS AND METHODS

(71) Applicant: Orion Energy Systems, Inc., Manitowoc, WI (US)

(72) Inventors: Neal R. Verfuerth, Plymouth, WI (US); Daniel J. Czaja, Jr., Minneapolis, MN (US); Michael J. Potts, Plymouth, WI (US); Ryan M. Franzen, Manitowoc, WI (US); Eric A. Smasal, Jackson, WI (US)

(73) Assignee: ORION ENERGY SYSTEMS, INC., Manitowoc, WI (US)

( * ) Notice: Subject to any disclaimer, the term of this patent is extended or adjusted under 35 U.S.C. 154(b) by 759 days.

This patent is subject to a terminal disclaimer.

(21) Appl. No.: 14/330,231

(22) Filed: Jul. 14, 2014

(65) Prior Publication Data

US 2015/0008830 A1 Jan. 8, 2015

Related U.S. Application Data

(63) Continuation of application No. 13/902,449, filed on May 24, 2013, now Pat. No. 8,779,340, which is a
(Continued)

(51) Int. Cl.
*H05B 41/38* (2006.01)
*H05B 37/02* (2006.01)

(52) U.S. Cl.
CPC ......... *H05B 41/38* (2013.01); *H05B 37/0227* (2013.01); *H05B 37/0272* (2013.01); *H05B 37/0281* (2013.01); *Y02B 20/42* (2013.01)

(58) Field of Classification Search
CPC ............ H04N 5/23203; H05B 37/0245; H05B 41/38; H05B 37/0227; H05B 37/0272; H05B 37/0281; Y02B 20/42
(Continued)

(56) References Cited

U.S. PATENT DOCUMENTS

| 1,254,520 A | 1/1918 | MacDuff |
| 2,403,240 A | 7/1946 | Sawin |

(Continued)

FOREIGN PATENT DOCUMENTS

| GB | 2 237 826 | 5/1991 |
| GB | 2 250 172 | 6/1992 |

(Continued)

OTHER PUBLICATIONS

"About Sun Dome Tubular Skylights," having a date indication of © 2009, 8 pages.
(Continued)

*Primary Examiner* — Georgia Y Epps
*Assistant Examiner* — Don Williams
(74) *Attorney, Agent, or Firm* — Marshall, Gerstein & Borun LLP

(57) ABSTRACT

A lighting fixture system for lamps includes one or more lamps and one or more ballasts configured to provide controlled power to the one or more lamps. The lighting fixture further includes a controller wired to the lighting fixture. The controller includes one or more relays configured to turn power provided to the one or more ballasts on and off such that the one or more lamps turn on and off with the switching of the one or more relays. The controller further includes a logic circuit configured to control the switching of the one or more relays, wherein the logic circuit is configured to log usage information for the lighting fixture in memory. The controller yet further includes communica-
(Continued)

tions electronics configured to output the logged usage information.

20 Claims, 20 Drawing Sheets

Related U.S. Application Data continuation of application No. 12/550,270, filed on Aug. 28, 2009, now Pat. No. 8,450,670, which is a continuation-in-part of application No. 11/771,317, filed on Jun. 29, 2007, now Pat. No. 7,638,743, and a continuation-in-part of application No. 12/240,805, filed on Sep. 29, 2008, now Pat. No. 8,344,665, which is a continuation-in-part of application No. 12/057,217, filed on Mar. 27, 2008, now Pat. No. 8,406,937.

(58) Field of Classification Search
USPC .................. 250/205, 239; 340/555–557; 315/149–159
See application file for complete search history.

(56) References Cited

U.S. PATENT DOCUMENTS

| | | | |
|---|---|---|---|
| 2,485,148 A | 10/1949 | Fralin | |
| 2,636,977 A | 4/1953 | Foster | |
| 3,292,319 A | 12/1966 | McCarthy | |
| 3,337,035 A | 8/1967 | Pennybacker | |
| 3,416,266 A | 12/1968 | Eron | |
| 3,511,559 A | 5/1970 | Foster | |
| 3,757,290 A | 9/1973 | Ross et al. | |
| 4,013,922 A * | 3/1977 | Van Der Meulen | A61N 5/0614 315/120 |
| 4,023,043 A | 5/1977 | Stevenson | |
| 4,114,186 A | 9/1978 | Dominguez | |
| 4,135,181 A | 1/1979 | Bogacki et al. | |
| 4,144,462 A | 3/1979 | Sieron et al. | |
| 4,190,800 A | 2/1980 | Kelly et al. | |
| 4,204,194 A | 5/1980 | Bogacki | |
| 4,204,195 A | 5/1980 | Bogacki | |
| 4,306,769 A | 12/1981 | Martinet | |
| 4,360,881 A | 11/1982 | Martinson | |
| 4,387,417 A | 6/1983 | Plemmons et al. | |
| 4,489,386 A | 12/1984 | Breddan | |
| 4,727,593 A | 2/1988 | Goldstein | |
| 4,733,505 A | 3/1988 | Van Dame | |
| 4,809,468 A | 3/1989 | Bareiss | |
| 4,841,914 A | 6/1989 | Chattan | |
| 4,860,511 A | 8/1989 | Weisner et al. | |
| 4,883,340 A | 11/1989 | Dominguez | |
| 4,998,095 A | 3/1991 | Shields | |
| 5,099,622 A | 3/1992 | Sutton | |
| 5,165,465 A | 11/1992 | Kenet | |
| 5,253,444 A | 10/1993 | Donoho et al. | |
| 5,261,179 A | 11/1993 | Schwinler | |
| 5,353,543 A | 10/1994 | Teraoka | |
| 5,371,661 A | 12/1994 | Simpson | |
| 5,426,620 A | 6/1995 | Budney | |
| 5,546,712 A | 8/1996 | Bixby | |
| 5,572,438 A | 11/1996 | Ehlers et al. | |
| 5,598,042 A | 1/1997 | Mix et al. | |
| 5,644,173 A | 7/1997 | Elliason et al. | |
| 5,649,394 A | 7/1997 | Ohba | |
| 5,655,339 A | 8/1997 | DeBlock et al. | |
| 5,713,160 A | 2/1998 | Heron | |
| 5,717,609 A | 2/1998 | Packa et al. | |
| 5,729,387 A | 3/1998 | Takahashi et al. | |
| 5,758,331 A | 5/1998 | Johnson | |
| 5,836,114 A | 11/1998 | Ohba | |
| 5,918,404 A | 7/1999 | Ohba | |
| 5,956,462 A | 9/1999 | Langford | |
| 5,962,989 A | 10/1999 | Baker | |
| 6,003,471 A | 12/1999 | Ohba | |
| 6,122,603 A | 9/2000 | Budike, Jr. | |
| 6,169,979 B1 | 1/2001 | Johnson | |
| 6,255,786 B1 * | 7/2001 | Yen | H05B 33/0857 315/291 |
| 6,257,735 B1 | 7/2001 | Baar | |
| D447,266 S | 8/2001 | Verfuerth | |
| 6,363,667 B2 | 4/2002 | O'Neill | |
| 6,367,419 B1 | 4/2002 | Gosselin | |
| 6,418,674 B1 | 7/2002 | Deraedt | |
| D463,059 S | 9/2002 | Verfuerth | |
| 6,467,933 B2 | 10/2002 | Baar | |
| 6,524,175 B2 | 2/2003 | Beaudry et al. | |
| 6,528,782 B1 | 3/2003 | Zhang et al. | |
| 6,528,957 B1 | 3/2003 | Luchaco | |
| 6,535,859 B1 | 3/2003 | Yablonowski et al. | |
| 6,585,396 B1 | 7/2003 | Verfuerth | |
| D479,826 S | 9/2003 | Verfuerth et al. | |
| 6,622,097 B2 | 9/2003 | Hunter | |
| 6,633,823 B2 | 10/2003 | Bartone et al. | |
| 6,644,836 B1 | 11/2003 | Adams | |
| D483,332 S | 12/2003 | Verfuerth | |
| 6,671,586 B2 | 12/2003 | Davis et al. | |
| 6,717,660 B1 | 4/2004 | Bernardo | |
| 6,731,080 B2 * | 5/2004 | Flory | H05B 41/36 315/312 |
| D494,700 S | 8/2004 | Hartman et al. | |
| 6,774,790 B1 | 8/2004 | Houston | |
| 6,785,592 B1 | 8/2004 | Smith et al. | |
| 6,813,864 B2 | 11/2004 | Landis | |
| 6,828,695 B1 | 12/2004 | Hansen | |
| 6,832,135 B2 | 12/2004 | Ying | |
| 6,894,609 B2 | 5/2005 | Menard et al. | |
| 6,938,210 B1 | 8/2005 | Huh | |
| 6,979,097 B2 | 12/2005 | Elam et al. | |
| 6,983,210 B2 | 1/2006 | Matsubayashi et al. | |
| 6,990,394 B2 | 1/2006 | Pasternak | |
| 7,027,736 B1 | 4/2006 | Mier-Langner et al. | |
| 7,130,719 B2 | 10/2006 | Ehlers et al. | |
| 7,130,832 B2 | 10/2006 | Bannai et al. | |
| 7,167,777 B2 | 1/2007 | Budike, Jr. | |
| 7,259,527 B2 | 8/2007 | Foo | |
| 7,264,177 B2 | 9/2007 | Buck et al. | |
| D557,817 S | 12/2007 | Verfuerth | |
| 7,307,542 B1 | 12/2007 | Chandler et al. | |
| D560,469 S | 1/2008 | Bartol et al. | |
| 7,369,056 B2 | 5/2008 | McCollough, Jr. | |
| 7,401,942 B1 | 7/2008 | Verfuerth et al. | |
| 7,446,671 B2 | 11/2008 | Giannopoulos et al. | |
| 7,518,531 B2 | 4/2009 | Butzer et al. | |
| D595,894 S | 7/2009 | Verfuerth et al. | |
| 7,557,524 B2 * | 7/2009 | Chevalier | H05B 33/0803 250/214 AL |
| 7,563,006 B1 | 7/2009 | Verfuerth et al. | |
| 7,575,338 B1 | 8/2009 | Verfuerth | |
| D606,697 S | 12/2009 | Verfuerth et al. | |
| 7,628,506 B2 | 12/2009 | Verfuerth et al. | |
| 7,638,743 B2 | 12/2009 | Bartol et al. | |
| 7,660,652 B2 | 2/2010 | Smith et al. | |
| D617,028 S | 6/2010 | Verfuerth et al. | |
| D617,029 S | 6/2010 | Verfuerth et al. | |
| 7,738,999 B2 | 6/2010 | Petite | |
| 7,746,003 B2 | 6/2010 | Verfuerth et al. | |
| 7,762,861 B2 | 7/2010 | Verfuerth et al. | |
| D621,410 S | 8/2010 | Verfuerth et al. | |
| D621,411 S | 8/2010 | Verfuerth et al. | |
| 7,780,310 B2 | 8/2010 | Verfuerth et al. | |
| 7,784,966 B2 | 8/2010 | Verfuerth et al. | |
| D623,340 S | 9/2010 | Verfuerth et al. | |
| 7,812,543 B2 | 10/2010 | Budike, Jr. | |
| 7,847,706 B1 | 12/2010 | Ross et al. | |
| 7,859,398 B2 | 12/2010 | Davidson et al. | |
| D632,006 S | 2/2011 | Verfuerth et al. | |
| 8,033,686 B2 | 10/2011 | Recker et al. | |
| 8,035,320 B2 | 10/2011 | Sibert | |
| D650,225 S | 12/2011 | Bartol et al. | |
| 8,070,312 B2 | 12/2011 | Verfuerth et al. | |
| 8,138,690 B2 | 3/2012 | Chemel et al. | |
| 8,255,090 B2 | 8/2012 | Frader-Thompson et al. | |

(56) References Cited

U.S. PATENT DOCUMENTS

| | | |
|---|---|---|
| 8,344,665 B2 | 1/2013 | Verfuerth et al. |
| 8,373,362 B2 | 2/2013 | Chemel et al. |
| 8,376,600 B2 | 2/2013 | Bartol et al. |
| 8,450,670 B2 | 5/2013 | Verfuerth et al. |
| 8,531,134 B2 | 9/2013 | Chemel et al. |
| 8,543,249 B2 | 9/2013 | Chemel et al. |
| 8,610,377 B2 | 12/2013 | Chemel et al. |
| 8,626,643 B2 | 1/2014 | Verfuerth et al. |
| 8,884,203 B2 | 11/2014 | Verfuerth et al. |
| 2001/0055965 A1 | 12/2001 | Delp et al. |
| 2002/0060283 A1 | 5/2002 | Jordan et al. |
| 2002/0065583 A1 | 5/2002 | Okada et al. |
| 2002/0082748 A1 | 6/2002 | Enga et al. |
| 2002/0103655 A1 | 8/2002 | Boies et al. |
| 2002/0162032 A1 | 10/2002 | Gundersen et al. |
| 2002/0172049 A1 | 11/2002 | Yueh |
| 2002/0173321 A1 | 11/2002 | Marsden et al. |
| 2003/0011486 A1 | 1/2003 | Ying |
| 2003/0016143 A1 | 1/2003 | Ghazarian |
| 2003/0036820 A1 | 2/2003 | Yellepeddy et al. |
| 2003/0041017 A1 | 2/2003 | Spool et al. |
| 2003/0041038 A1 | 2/2003 | Spool et al. |
| 2003/0046252 A1 | 3/2003 | Spool et al. |
| 2003/0084358 A1 | 5/2003 | Bresniker et al. |
| 2003/0084359 A1 | 5/2003 | Bresniker et al. |
| 2003/0093332 A1 | 5/2003 | Spool et al. |
| 2003/0171851 A1 | 9/2003 | Brickfield et al. |
| 2003/0179577 A1 | 9/2003 | Marsh |
| 2003/0229572 A1 | 12/2003 | Raines et al. |
| 2004/0006439 A1 | 1/2004 | Hunter |
| 2004/0024483 A1 | 2/2004 | Holcombe |
| 2004/0076001 A1 | 4/2004 | Lutes |
| 2004/0078153 A1 | 4/2004 | Bartone et al. |
| 2004/0078154 A1 | 4/2004 | Hunter |
| 2004/0083163 A1 | 4/2004 | Cooper |
| 2004/0095237 A1 | 5/2004 | Chen et al. |
| 2004/0128266 A1 | 7/2004 | Yellepeddy et al. |
| 2004/0193329 A1 | 9/2004 | Ransom et al. |
| 2004/0201448 A1 | 10/2004 | Wang |
| 2004/0243377 A1 | 12/2004 | Roytelman |
| 2005/0027636 A1 | 2/2005 | Gilbert et al. |
| 2005/0034023 A1 | 2/2005 | Maturana et al. |
| 2005/0035717 A1 | 2/2005 | Adamson et al. |
| 2005/0038571 A1 | 2/2005 | Brickfield et al. |
| 2005/0043860 A1 | 2/2005 | Petite |
| 2005/0124346 A1 | 6/2005 | Corbett et al. |
| 2005/0232289 A1 | 10/2005 | Walko et al. |
| 2005/0265050 A1 | 12/2005 | Miller |
| 2006/0002110 A1 | 1/2006 | Dowling et al. |
| 2006/0044152 A1 | 3/2006 | Wang |
| 2006/0044789 A1 | 3/2006 | Curtis |
| 2006/0065750 A1 | 3/2006 | Fairless |
| 2006/0085301 A1 | 4/2006 | Leahy |
| 2006/0125426 A1* | 6/2006 | Veskovic ........... H05B 37/0254 |
| | | 315/312 |
| 2006/0253885 A1 | 11/2006 | Murphy et al. |
| 2007/0027645 A1 | 2/2007 | Guenther et al. |
| 2007/0043478 A1 | 2/2007 | Ehlers et al. |
| 2007/0085701 A1 | 4/2007 | Walters et al. |
| 2007/0097993 A1 | 5/2007 | Bojahra et al. |
| 2007/0100571 A1 | 5/2007 | Miki |
| 2007/0145915 A1 | 6/2007 | Roberge et al. |
| 2007/0222581 A1 | 9/2007 | Hawkins et al. |
| 2007/0247859 A1 | 10/2007 | Haddad et al. |
| 2007/0252528 A1 | 11/2007 | Vermuelen et al. |
| 2008/0143273 A1 | 6/2008 | Davidson et al. |
| 2008/0147465 A1 | 6/2008 | Raines et al. |
| 2008/0183337 A1 | 7/2008 | Szabados |
| 2008/0218317 A1 | 9/2008 | Choi |
| 2008/0266664 A1 | 10/2008 | Winston et al. |
| 2008/0275802 A1 | 11/2008 | Verfuerth et al. |
| 2008/0291054 A1 | 11/2008 | Groft |
| 2008/0315772 A1 | 12/2008 | Knibbe |
| 2008/0316743 A1 | 12/2008 | Shaneour |
| 2009/0000217 A1 | 1/2009 | Verfuerth et al. |
| 2009/0059603 A1 | 3/2009 | Recker et al. |
| 2009/0090895 A1 | 4/2009 | Hogan, Jr. |
| 2009/0147507 A1 | 6/2009 | Verfuerth et al. |
| 2009/0150004 A1 | 6/2009 | Wang et al. |
| 2009/0222142 A1 | 9/2009 | Kao et al. |
| 2009/0243517 A1 | 10/2009 | Verfuerth et al. |
| 2009/0248217 A1 | 10/2009 | Verfuerth et al. |
| 2009/0251066 A1* | 10/2009 | Baaijens ................ H05B 41/38 |
| | | 315/294 |
| 2009/0299811 A1 | 12/2009 | Verfuerth et al. |
| 2009/0315485 A1 | 12/2009 | Verfuerth et al. |
| 2010/0061088 A1 | 3/2010 | Bartol et al. |
| 2010/0246168 A1 | 9/2010 | Verfuerth et al. |
| 2011/0060701 A1 | 3/2011 | Verfuerth et al. |
| 2011/0146669 A1 | 6/2011 | Bartol et al. |
| 2011/0235317 A1 | 9/2011 | Verfuerth et al. |
| 2011/0279063 A1 | 11/2011 | Wang et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0081906 A1 | 4/2012 | Verfuerth et al. |
| 2012/0167957 A1 | 7/2012 | Verfuerth et al. |
| 2012/0274222 A1 | 11/2012 | Verfuerth et al. |
| 2013/0006437 A1 | 1/2013 | Verfuerth et al. |
| 2013/0033183 A1 | 2/2013 | Verfuerth et al. |
| 2013/0094230 A1 | 4/2013 | Verfuerth et al. |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

Deru et al.; BigHorn Home Improvement Center Energy Performance; ASHRAE Transactions, Atlanta: 2006 vol. 112, 26 pages.

Galasiu et al. "Energy saving lighting control systems for open-plan offices: a filed study"; Jul. 2007, National Research Council Canada; vol. 4; No. 1, pp. 1-28, 56 pages.

Halliday, D., et al., Physics Part I and II; John Wiley& Sons, Inc. 1967 (9 pgs.).

Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.

Notice of Acceptance (NOA) from Miami-Dade County, Building Code Compliance Office, Product Control Division, Approval Date Dec. 13, 2007, 2 pages.

Sun-Dome /Tubular Skylight, Daylighting Technologies, Riviera Beach, FL, revision Oct. 22, 2007, 1 page.

* cited by examiner

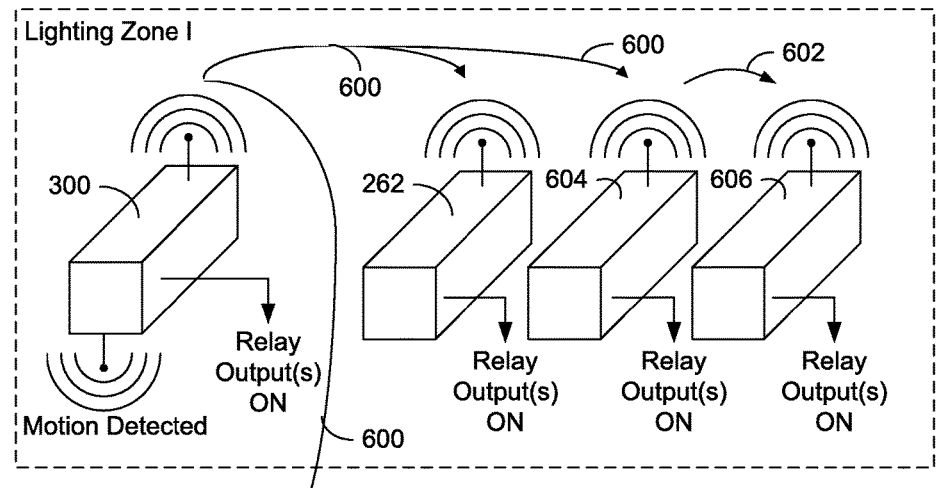
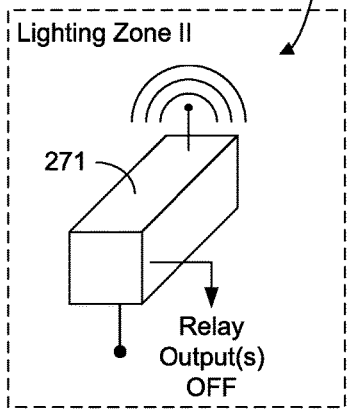
FIG. 6
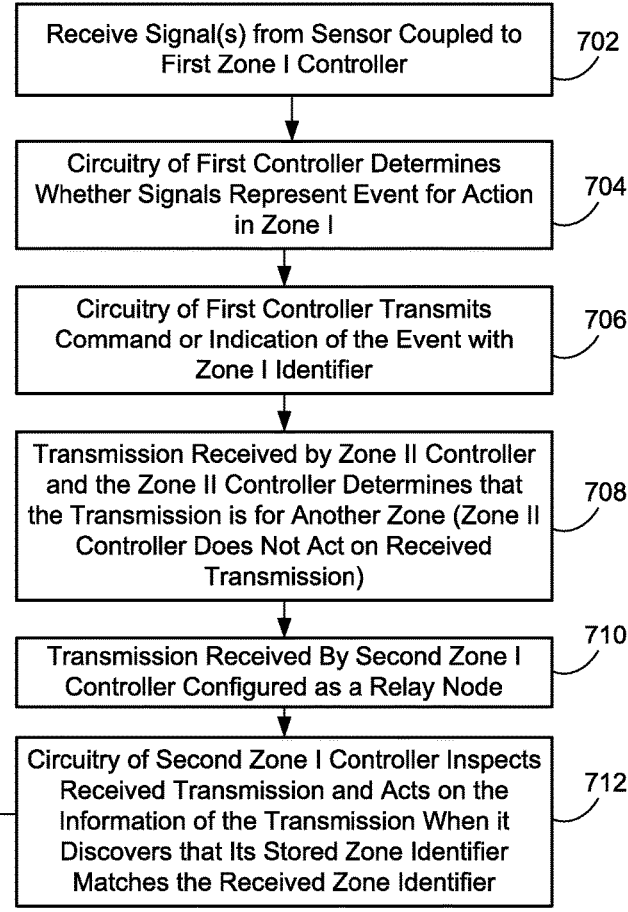
FIG. 7

LIGHTING FIXTURE CONTROL SYSTEMS AND METHODS

CROSS-REFERENCE TO RELATED PATENT APPLICATIONS

This application is a Continuation of U.S. application Ser. No. 13/902,449, filed May 24, 2013, incorporated herein by reference in its entirety. U.S. application Ser. No. 13/902,449 is a Continuation of U.S. application Ser. No. 12/550,270, filed Aug. 28, 2009, incorporated herein by reference in its entirety. U.S. application Ser. No. 12/550,270 is a Continuation-In-Part of U.S. application Ser. No. 12/240,805, filed Sep. 29, 2008, incorporated herein by reference in its entirety, which is a Continuation-In-Part of U.S. application Ser. No. 12/057,217, filed Mar. 27, 2008, incorporated herein by reference in its entirety. U.S. application Ser. No. 12/550,270 is also a Continuation-In-Part of U.S. application Ser. No. 11/771,317, filed Jun. 29, 2007, incorporated herein by reference in its entirety.

BACKGROUND

The present application relates generally to the field of lighting systems and lighting fixtures. The present application further relates to lighting fixture control systems and methods.

Control of lighting fixtures has conventionally been accomplished via hardwired switches. Some conventional lighting fixtures include a wireless receiver or transceiver for receiving commands from a control station. Conventional lighting fixtures have typically not been adaptable to different environmental changes or situations.

SUMMARY

One embodiment of the invention relates to a lighting fixture system for fluorescent lamps. The lighting fixture includes one or more fluorescent lamps and one or more ballasts configured to provide controlled power to the one or more fluorescent lamps. The lighting fixture further includes a controller wired to the fluorescent lighting fixture. The controller includes one or more relays configured to turn power provided to the one or more ballasts on and off such that the one or more fluorescent lamps turn on and off with the switching of the one or more relays. The controller further includes a logic circuit configured to control the switching of the one or more relays, wherein the logic circuit is configured to log usage information for the fluorescent lighting fixture in memory. The controller yet further includes communications electronics configured to output the logged usage information. The communications electronics may include a radio frequency transceiver configured to output the logged usage information via wireless communications. In other embodiments the communications electronics may include a wired interface configured to output the logged usage information via a wired communications medium.

Another embodiment of the invention relates to a system for controlling lighting in a building. The system includes a plurality of lighting fixtures coupled to electronics configured to control local on/off switching of ballasts for the plurality of lighting fixtures. The electronics are configured to log usage information for the fixture and wherein the electronics retain a zone identifier for the associated lighting fixture. The system further includes a computing system configured to receive the usage information from the plurality of lighting fixtures and to calculate energy use information for the plurality of lighting fixture by aggregating the usage information for the plurality of lighting fixtures. The computing system is further configured to cause the calculated energy use information to be displayed on an electronic display in communication with the computing system.

Yet another embodiment of the invention relates to a device for controlling a fluorescent lighting fixture. The device includes a control circuit configured to cause one or more lamps of the fluorescent lighting fixture to turn on and off. The device further includes a sensor and a logic circuit configured to receive a signal from the sensor and to use the signal to determine whether the control circuit should change states. The logic circuit is further configured to log usage information for the lighting fixture. The device further includes a radio frequency transceiver configured to transmit the logged usage information and to receive commands via radio frequency communications. The control circuit is further configured to cause the one or more lamps of the fluorescent lighting fixture to turn on and off based on the received commands.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 6 is a diagram of an exemplary control system and related control activity, according to an exemplary embodiment;

FIG. 7 is a flow chart of a process for controlling multiple lighting fixtures in a zone based on sensor input, according to an exemplary embodiment.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, a controller local to a lighting fixture is configured to intelligently utilize information available to the controller. The controller may conduct its own control decisions based on, for example, input from a motion sensor or ambient lighting sensor local to the controller. The controller may also include communications electronics for receiving "on/off" or other commands from a remote source (e.g., a network of lighting fixtures, a master controller, etc.). Regardless of the source for control decisions of the controller, the controller is configured to log usage information for the lighting fixture in memory local to the controller. In various exemplary embodiments, the controller includes communications electronics for communicating the logged information to other devices. The logged usage information may be used by other devices in the execution of a system-wide control scheme, in the execution of control algorithms relating particularly to the lighting fixture and controller that logged the information, or otherwise. The controller local to the lighting fixture can also use its own logged usage information during its local control decisions.

The controllers described herein can also relate to or be configured to control the electricity provided to devices other than lights. The controllers provided to lighting fixtures distributed around a space can advantageously be used to create a "grid" or wireless infrastructure in a facility that can be used to carry data communications from control systems and user interfaces to wireless relays located remotely from the control systems.

Figure 1:
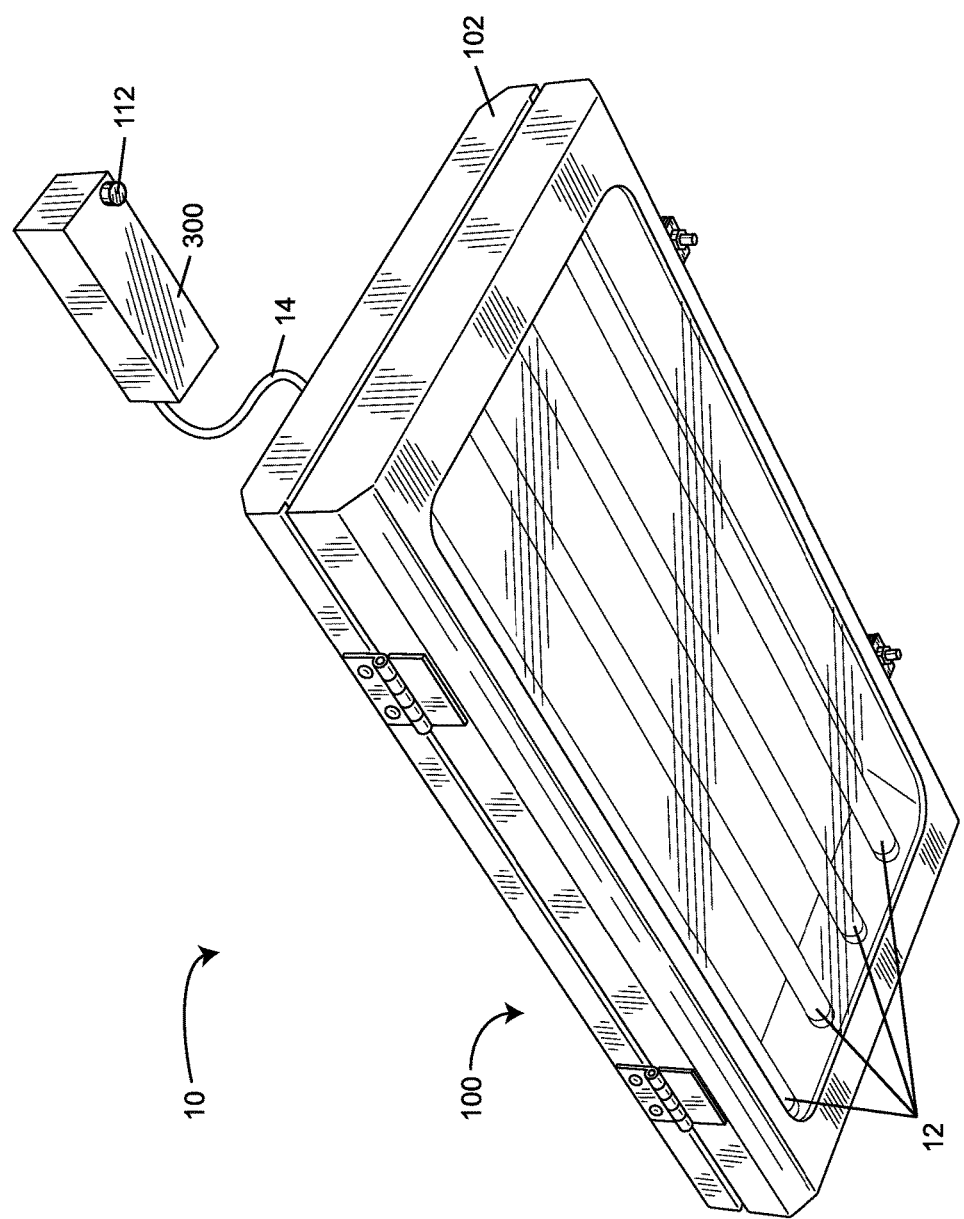
FIG. 1 is a perspective view of a lighting fixture system 10 including a lighting fixture 100 wired to a controller 300, according to an exemplary embodiment.

Referring now to FIG. 1, an underside perspective view of a fluorescent lighting fixture system 10 is shown, according to an exemplary embodiment. Lighting fixture system 10 includes a lighting fixture 100 and a controller 300. Controller 300 is connected to lighting fixture 100 via wire 14. Controller 300 is configured to control the switching between different states of lighting fixture 100 (e.g., all lamps on, all lamps off, some lamps on, etc.). According to various embodiments, controller 300 is further configured to log usage information for lighting fixture 100 in a memory device local to controller 300. Controller 300 may further be configured to use the logged usage information to affect control logic of controller 300. Controller 300 may also or alternatively be configured to provide the logged usage information to another device for processing, storage, or display. Controller 300 is shown to include a sensor 112 coupled to controller 300 (e.g., controller 300's exterior housing). Controller 300 may be configured to use signals received from sensor 112 to affect control logic of controller 300. Further, controller 300 may be configured to provide information relating to sensor 112 to another device.

Referring still to FIG. 1, lighting fixture 100 is shown to include a housing 102 (e.g., frame, fixture pan, etc.) within which fluorescent lamps 12 are housed. While various Figures of the present application, including FIG. 1, illustrate lighting fixtures for fluorescent lamps, it should be noted that embodiments of the present application may be utilized with any type of lighting fixture and/or lamps. Further, while housing 102 is shown as being fully enclosed (e.g., having a door and window covering the underside of the fixture), it should be noted that any variety of lighting fixture shapes, styles, or types may be utilized with embodiments of the present application. Further, while controller 300 is shown as having a housing that is exterior to housing 102 of lighting fixture 100, it should be appreciated that controller 300 may be physically integrated with housing 102. For example, one or more circuit boards or circuit elements of controller 300 may be housed within, on top of, or otherwise secured to housing 102. Further, in other exemplary embodiments, controller 300 (including its housing) may be coupled directly to housing 102. For example, controller 300's housing may be latched, bolted, clipped, or otherwise coupled to the interior or exterior of housing 102. Controller 300's housing may generally be shaped as a rectangle (as shown), may include one or more non-right angles or curves, or otherwise configured. In an exemplary embodiment, controller 300's housing is made of plastic and housing 102 for the lighting fixture 100 is made from metal. In other embodiments, other suitable materials may be used.

Figure 2A:
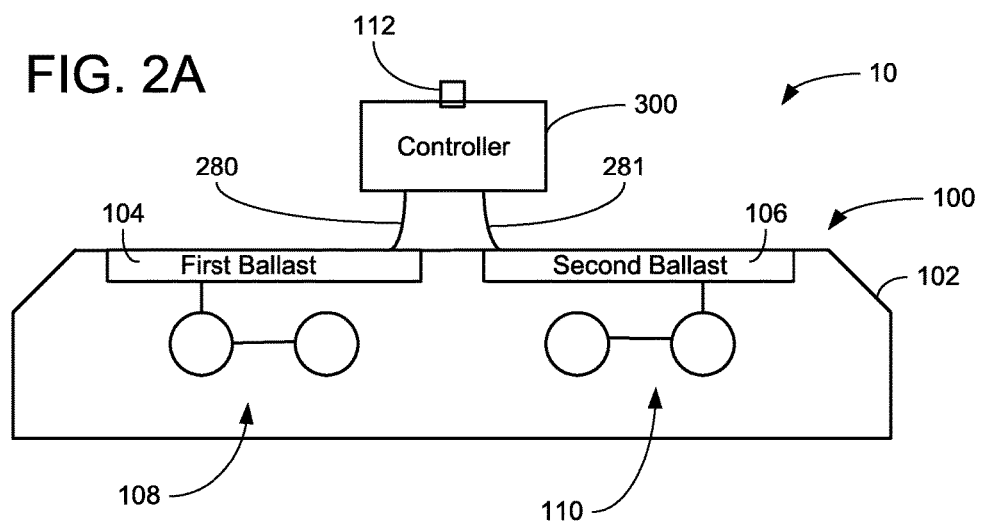
FIG. 2A is a schematic side-view of lighting fixture system 10 shown in FIG. 1, according to an exemplary embodiment.
Figure 14:
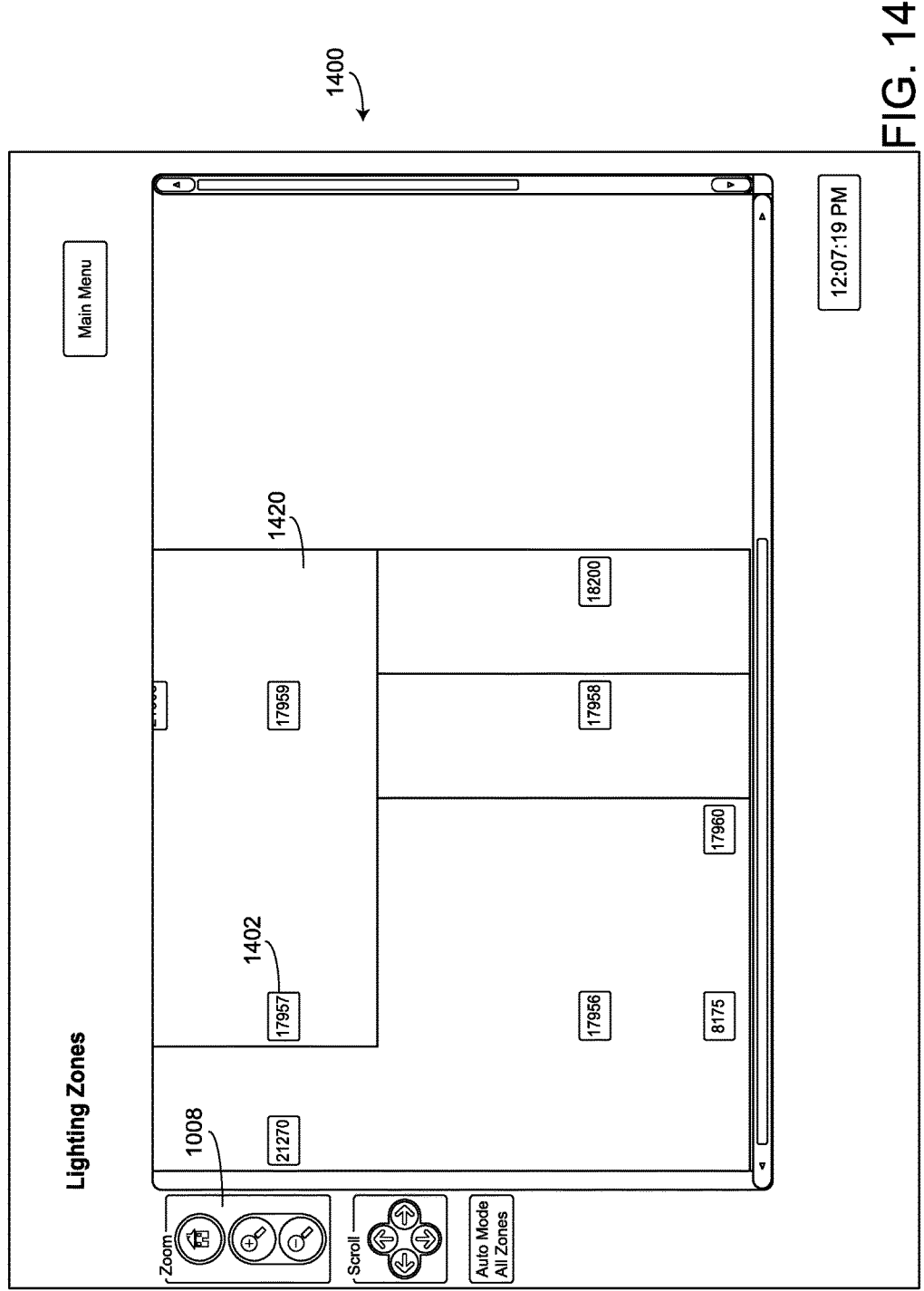

Referring now to FIG. 2A, a diagram of lighting fixture system 10 is shown, according to an exemplary embodiment. Lighting fixture 100 is shown to include two lamp sets 108, 110 with two fluorescent lamps forming each lamp set. Each lamp set 108, 110 may further include one or any number of additional fluorescent lamps. Lighting fixture 100 is further shown to include first ballast 104 and second ballast 106. However, while some embodiments described herein relate to the utilization of multiple lamp sets or ballasts within a single lighting fixture, it should be appreciated that many embodiments of the present application may only include a single lamp set and a single ballast. In other embodiments, more than two ballasts and lamp sets may be included in a single lighting fixture. While the fluorescent lamps are illustrated as tube lamps extending lengthwise relative to the lighting fixture, the fluorescent lamps may be compact fluorescent bulbs, lamps or bulbs of any other type or technology, run perpendicular to the length of the lighting fixture, or be otherwise oriented. Controller 300 is shown as wired to ballasts 104, 106 via wires 280, 281 (which may be contained within one cable or wire loom such as shown in FIG. 14).

Figure 2B:
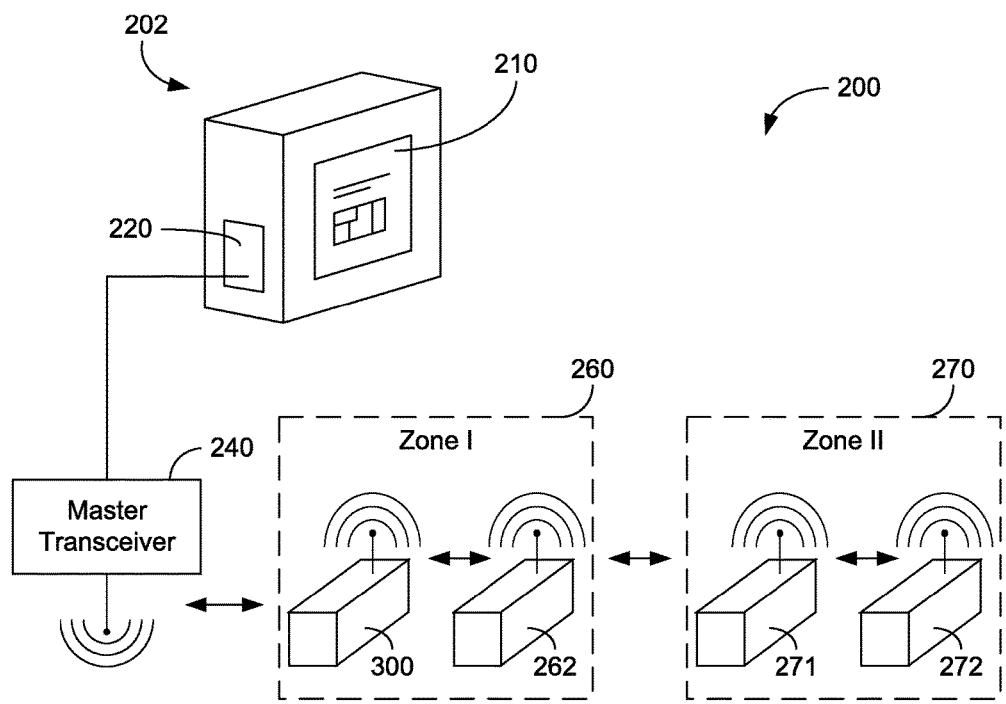
FIG. 2B is a diagram of a facility lighting system 200 for use with lighting fixture system 10, according to an exemplary embodiment.

Referring now to FIG. 2B, a diagram of a facility lighting system 200 for use with lighting fixture system 10 including controller 300 and lighting fixture 100 is shown, according to an exemplary embodiment. Facility lighting system 200 is shown to include control computer 202 that is configured to conduct or coordinate control activities relative to multiple lighting fixture controllers such as controller 300.

Control computer 202 is preferably configured to provide a graphical user interface to a local or remote electronic display screen for allowing a user to adjust control parameters, turn lighting fixtures on or off, or to otherwise affect the operation of lighting fixtures in a facility. For example, control computer 202 is further shown to include touch screen display 210 for displaying such a graphical user interface and for allowing user interaction (e.g., input and output) with control computer 202. Various exemplary graphical user interfaces for display on touch screen display 210 and control activities associated therewith are described in subsequent paragraphs and with reference to subsequent Figures of the present application. It should be noted that while control computer 202 is shown in FIG. 2B as housed in a wall-mounted panel it may be housed in or coupled to any other suitable computer casing or frame. The user interfaces, examples of which are shown in FIGS. 8-22, are intended to provide an easily configurable lighting and/or energy management system for a facility. The user interfaces are intended to allow even untrained users to reconfigure or reset a lighting system using relatively few clicks. In an exemplary embodiment, the user interfaces do not require a keyboard for entering values. Advantageously, users other than building managers may be able to setup, interact with, or reconfigure the system using the provided user interfaces.

Referring further to FIG. 2B, control computer 202 is shown as connected to master transceiver 240. Master transceiver 240 may be a radio frequency transceiver configured to provide wireless signals to a network of controllers such as controller 300. In FIG. 2B, master transceiver 240 is shown in bi-directional wireless communication with a plurality of lighting fixture controllers 300, 262, 271, and 272. FIG. 2B further illustrates controllers 300 and 262 forming a first logical group 260 identified as "Zone I" and a second logical group 270 identified as "Zone II." Control computer 202 may be configured to provide different processing or different commands for "Zone I" relative to "Zone II." While control computer 202 is configured to complete a variety of control activities for lighting fixture controllers 300, 262, 271, 272, in many exemplary embodiments of the present application, each controller associated with a lighting fixture (e.g., controllers 300, 262, 271, 272) includes circuitry configured to provide a variety of "smart" or "intelligent features" that are either independent of control computer 202 or operate in concert with control computer 202. A detailed block diagram of such a controller is shown in FIG. 3.

Figure 3:
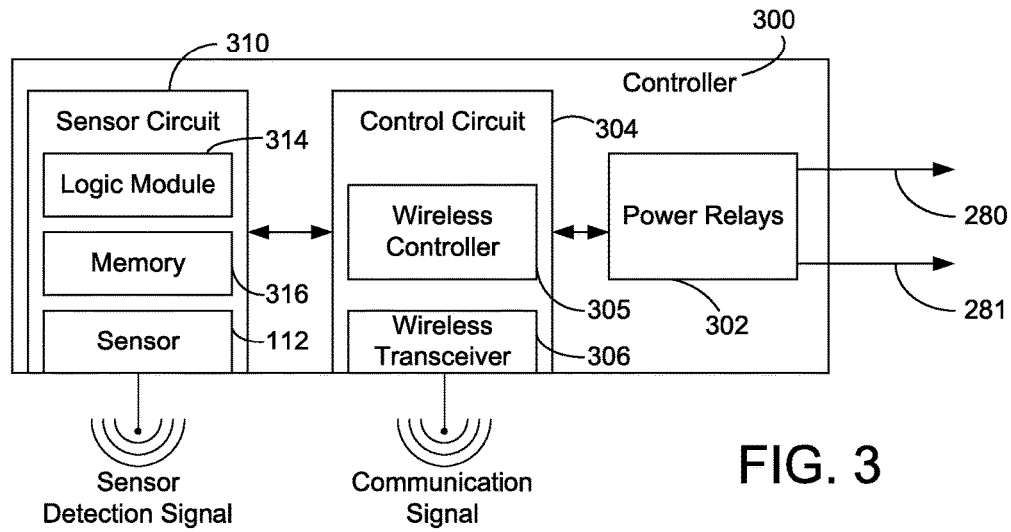
FIG. 3 is a block diagram of controller 300 shown in FIGS. 1-2B, according to an exemplary embodiment.

Referring now to FIG. 3, a detailed block diagram of controller 300 is shown, according to an exemplary embodiment. Controller 300 is generally configured to include circuitry configured with an algorithm to control on/off cycling of connected lighting fixtures, an algorithm to log usage information for the lighting fixture, an algorithm configured to prevent premature restrikes to limit wear on the lamps and ballast, and an algorithm configured to allow controller 300 to send and receive commands or information from other peer devices independently from a master controller or master transceiver.

Controller 300 is shown to include power relays 302 configured to controllably switch on or off high voltage power outputs that may be provided to first ballast 104 and second ballast 106 via wires 280, 281. It should be noted that in other exemplary embodiments, power relays 302 may be configured to provide a low voltage control signal, optical signal, or otherwise to the lighting fixture which may cause one or more ballasts, lamps, and/or circuits of the fluorescent lighting fixture that the controller serves to turn on and off. While power relays 302 are configured to provide high voltage power outputs to ballasts 104, 106, it should be appreciated that controller 300 may include a port, terminal, receiver, or other input for receiving power from a high voltage power source. In embodiments where a relatively low voltage or no voltage control signal is provided by relays 302, power for circuitry of controller 300 may be received from a power source provided to the lighting fixtures or from another source. In any embodiment of controller 300, appropriate power supply circuitry (e.g., filtering circuitry, stabilizing circuitry, etc.) may be included with controller 300 to provide power to the components of controller 300 (e.g., relays 302).

Referring still to FIG. 3, controller 300 is shown to include control circuit 304 which receives and provides data or control signals from/to power relays 302 and sensor circuit 310. Control circuit 304 is configured to cause one or more lamps of the fluorescent lighting fixture to turn on and off via control signals sent to power relays 302. Control circuit 304 can make a determination that an "on" or "off" signal should be sent to power relays 302 based on inputs received from wireless controller 305 or sensor circuit 310. For example, a command to turn the lighting fixture "off" may be received at wireless transceiver 306 and interpreted by wireless controller 305. Upon recognizing the "off" command, wireless controller 305 provides an appropriate control signal to control circuit 304 which causes control circuit 304 to switch one or more of power relays 302 off. Similarly, when sensor circuit 310 including sensor 112 experiences an environmental condition, logic module 314 may determine whether or not the controller and control circuit 304 should change "on/off" states. For example, if a high ambient lighting level is detected by sensor 112, logic module 314 may determine that control circuit 304 should change states such that power relays 302 are "off." Conversely, if a low ambient lighting level is detected by sensor 112, logic module 314 may cause control circuit 304 to turn power relays 302 "on." Other control decisions, logic and activities provided by controller 300 and the components thereof are described below and with reference to other Figures.

When or after control decisions based on sensor 112 or commands received at wireless transceiver are made, in some exemplary embodiments, logic module 314 is configured to log usage information for the lighting fixture in memory 316. For example, if control circuit 304 causes power relays 302 to change states such that the lighting fixture turns on or off, control circuit 304 may inform logic module 314 of the state change and logic module 314 may log usage information based on the information from control circuit 304. The form of the logged usage information can vary for different embodiments. For example, in some embodiments, the logged usage information includes an event identifier (e.g., "on", "off", cause for the state change, etc.) and a timestamp (e.g., day and time) from which total usage may be derived. In other embodiments, the total "on" time for the lighting fixture (or lamp set) is counted such that only an absolute number of hours that the lamp has been on (for whatever reason) has been tracked and stored as the logged usage information. In addition to logging or aggregating temporal values, each logic module 314 may be configured to process usage information or transform usage information into other values or information. For example, in some embodiments time-of-use information is transformed by logic module 314 to track the energy used by the lighting fixture (e.g., based on bulb ratings, known energy draw of the fixture in different on/off/partial on modes, etc.). In some embodiments, each logic module 314 will also track how much energy savings the lighting fixture is achieving relative to a conventional lighting fixture, conventional control logic, or relative to another difference or change of the lighting fixture. For the purposes of many embodiments of this application, any such information relating to usage for the lighting fixture may be considered logged "usage information." In other embodiments, the usage information logged by module 314 is limited to on/off events or temporal aggregation of on states; in such embodiments energy savings calculations or other calculations may be completed by a control computer 202 or another remote device.

In an exemplary embodiment, controller 300 (e.g., via wireless transceiver 306) is configured to transmit the logged usage information to remote devices such as control computer 202. Wireless controller 305 may be configured to recall the logged usage information from memory 316 at periodic intervals (e.g., every hour, once a day, twice a day, etc.) and to provide the logged usage information to wireless transceiver 306 at the periodic intervals for transmission back to control computer 202. In other embodiments, control computer 202 (or another network device) transmits a request for the logged information to wireless transceiver 306 and the request is responded to by wireless controller 305 by transmitting back the logged usage information. In a preferred embodiment a plurality of controllers such as controller 300 asynchronously collect usage information for their fixture and control computer 202, via request or via periodic transmission of the information by the controllers, gathers the usage information for later use.

Wireless controller 306 may also be configured to handle situations or events such as transmission failures, reception failures, and the like. Wireless controller 306 may respond to such failures by, for example, operating according to a retransmission scheme or another transmit failure mitigation scheme. Wireless controller 306 may also control any other modulating, demodulating, coding, decoding, routing, or other activities of wireless transceiver 306. For example, controller 300's control logic (e.g., controlled by logic module 314 and/or control circuit 304) may periodically include making transmissions to other controllers in a zone, making transmissions to particular controllers, or otherwise. Such transmissions can be controlled by wireless controller 306 and such control may include, for example, maintaining a token-based transmission system, synchronizing clocks of the various RF transceivers or controllers, operating under a slot-based transmission/reception protocol, or otherwise.

Referring still to FIG. 3, sensor 112 may be an infrared sensor, an optical sensor, a camera, a temperature sensor, a photodiode, a carbon dioxide sensor, or any other sensor configured to sense environmental conditions such as a lighting level or human occupancy of a space. For example, in one exemplary embodiment, sensor 112 is a motion sensor and logic module 314 is configured to determine whether control circuit 304 should change states (e.g., change the state of power relays 302) based on whether motion is detected by sensor 112 (e.g., detected motion reaches or exceeds threshold value). In the same or other embodiments, logic module 314 may be configured to use the signal from the sensor 112 to determine an ambient lighting level. Logic module 314 may then determine whether to change states based on the ambient lighting level. For example, logic module 314 may use a condition such as time of day in addition to ambient lighting level to determine whether to turn the lighting fixture off or on. During a critical time of the day (e.g., when a staffed assembly line is moving), even if the ambient lighting level is high, logic module 314 may refrain from turning the lighting fixture off. In another embodiment, by way of further example, logic module 314 is configured to provide a command to control circuit 304 that is configured to cause control circuit 304 to turn the one or more lamps of the fluorescent lighting fixture on when logic module 314 detects motion via the signal from sensor 112 and when logic circuit 314 determines that the ambient lighting level is below a threshold setpoint.

Referring yet further to FIG. 3, control circuit 304 is configured to prevent damage to lamps 108 or 110 from manual or automatic control activities. Particularly, control circuit 304 may be configured to prevent on/off cycling of lamps 108, 110 by holding the lamps in an "on" state for a predefined period of time (e.g., thirty minutes, fifteen minutes, etc.) even after the condition that caused the lamp to turn on is no longer true. Accordingly, if, for example, a low ambient lighting level causes control circuit 304 to turn lamps 108, 110 on but then the ambient lighting level suddenly increases (the sun comes out), control circuit 304 may keep the lamps on (even though the on condition expired) for a predetermined period of time so that the lamps are taken through their preferred cycle. Similarly, control circuit 304 may be configured to hold the lamp in an "off" state for a predefined period of time since the lamp was last turned off to ensure that the lamp is given time to cool or otherwise settle after the last "on" state.

Referring yet further to FIG. 3, logic module 314 or control circuit 304 may be configured to include a restrike violation module (e.g., in memory 316) that is configured to prevent logic module 314 from commanding control circuit 304 to cause the fluorescent lamps to turn on while a restrike time is counted down. The restrike time may correspond with a maximum cool-down time for the lamp—allowing the lamp to experience its preferred strike-up cycle even if a command to turn the lamp back on is received at wireless transceiver 306. In other embodiments, logic module 314 or control circuit 304 may be configured to prevent rapid on/off switching due to sensed motion, another environmental condition, or a sensor or controller error. The logic module 314 or the control circuit 304 may be configured to, for example, entirely discontinue the on/off switching based on inputs received from the sensor by analyzing the behavior of the sensor, the switching, and a logged usage information. By way of further example, the logic circuit 314 or the control circuit 304 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.). Logic module 314 or control circuit 304 may be configured to log or communicate such a determination. Using such configurations, logic module 314 and/or control circuit 304 are configured to self-diagnose and correct undesirable behavior that would otherwise continue occurring based on the default, user, or system-configured settings.

According to one embodiment, a self-diagnostic feature would monitor the number of times that a fixture or device was instructed to turn on (or off) based upon a signal received from a sensor (e.g. motion, ambient light level, etc.). If the number of instructions to turn on (or off) exceeded a predetermined limit during a predetermined time period, the logic module 314 and/or control circuit 304 could be programmed to detect that the particular application for the fixture or device is not well-suited to control by such a sensor (e.g. not an optimum application for motion control or ambient light-based control, etc.), and would be programmed to disable such a motion or ambient light based control scheme, and report/log this action and the basis. For example, if the algorithm is based on more than four instructions to turn on (or off) in a 24 hour period, and the number of instructions provided based on signals from the sensor exceeds this limit within this period, the particular sensor-based control function would be disabled, as not being optimally suited to the application and a notification would be logged and provided to a user or facility manager. Of course, the limit and time period may be any suitable number and duration intended to suit the operational characteristics of the fixture/device and the application. In the event that a particular sensor-based control scheme in a particular zone is disabled by the logic module and/or control circuit, the fixture or device is intended to remain operational in response to other available control schemes (e.g. other sensors, time-based, user input or demand, etc.). The data logged by the logic module and/or control circuit may also be used in a 'learning capacity' so that the controls may be more optimally tuned for the fixtures/devices in a particular application and/or zone. For example, the logic module and/or control circuit may determine that disablement of a particular sensor-based control feature occurred due to an excessive number of instructions to turn on (or off) based on signals from a particular sensor that occurred within a particular time window, and may be reprogrammed to establish an alternate monitoring duration that excludes this particular time window for the particular sensor-based control scheme to 'avoid' time periods that are determined to be problematic. This ability to learn or self-update is intended to permit the system to adjust itself to update the sensor-based control schemes to different time periods that are more optimally suited for such a control scheme, and to avoid time periods that are less optimum for such a particular sensor-based control scheme.

Figure 4:
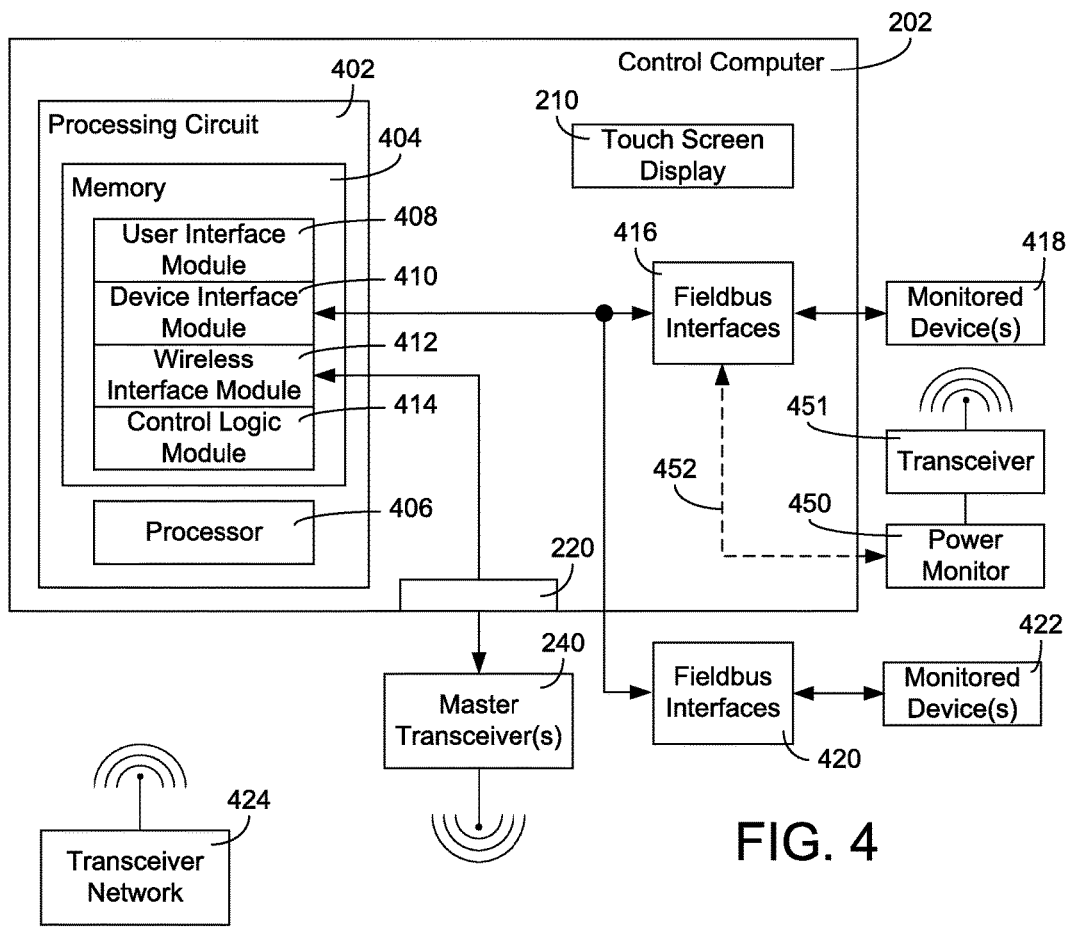
FIG. 4 is a block diagram of a control computer for a facility lighting system such as that shown in FIG. 2, according to an exemplary embodiment.

Referring now to FIG. 4, a more detailed block diagram of control computer 202 is shown, according to an exemplary embodiment. Control computer 202 may be configured as the "master controller" described in U.S. application Ser. No. 12/240,805, filed Sep. 29, 2008, and incorporated herein by reference in its entirety. Control computer 202 is generally configured to receive user inputs (e.g., via touchscreen display 210) and to set or change settings of lighting system 200 based on the user inputs.

Referring further to FIG. 4, control computer 202 is shown to include processing circuit 402 including memory 404 and processor 406. In an exemplary embodiment, control computer 202 and more particularly processing circuit 402 are configured to run a Microsoft Windows Operating System (e.g., XP, Vista, etc.) and are configured to include a software suite configured to provide the features described herein. The software suite may include a variety of modules (e.g., modules 408-414) configured to complete various activities of control computer 202. Modules 408-414 may be or include computer code, analog circuitry, one or more integrated circuits, or another collection of logic circuitry. In various exemplary embodiments, processor 406 may be a general purpose processor, a specific purpose processor, a programmable logic controller (PLC), a field programmable gate array, a combination thereof, or otherwise and configured to complete, cause the completion of, and/or facilitate the completion of the activities of control computer 202 described herein (e.g., as variously shown and described in and with references to FIGS. 1-22). Memory 404 may be configured to store historical data received from lighting fixture controllers or other building devices, configuration information, schedule information, setting information, zone information, or other temporary or archived information. Memory 404 may also be configured to store computer code for execution by processor 406. When executed, such computer code (e.g., stored in memory 404 or otherwise, script code, object code, etc.) configures processing circuit 402, processor 406 or more generally control computer 202 for the activities described herein.

Touch screen display 210 and more particularly user interface module 408 are configured to allow and facilitate user interaction (e.g., input and output) with control computer 202. It should be appreciated that in alternative embodiments of control computer 202, the display associated with control computer 202 may not be a touch screen, may be separated from the casing housing the control computer, and/or may be distributed from the control computer and connected via a network connection (e.g., Internet connection, LAN connection, WAN connection, etc.). Further, it should be appreciated that control computer 202 may be connected to a mouse, keyboard, or any other input device or devices for providing user input to control computer 202. Control computer is shown to include a communications interface 220 configured to connect to a wire associated with master transceiver 240.

Communications interface 220 may be a proprietary circuit for communicating with master transceiver 240 via a proprietary communications protocol. In other embodiments, communications interface 220 may be configured to communicate with master transceiver 240 via a standard communications protocol. For example, communications interface 220 may include Ethernet communications electronics (e.g., an Ethernet card) and an appropriate port (e.g., an RJ45 port configured for CAT5 cabling) to which an Ethernet cable is run from control computer 202 to master transceiver 240. Master transceiver 240 may be as described in U.S. application Ser. Nos. 12/240,805, 12/057,217, or 11/771,317 which are each incorporated herein by reference. Communications interface 220 and more generally master transceiver 240 are controlled by logic of wireless interface module 412. Wireless interface module 412 may include drivers, control software, configuration software, or other logic configured to facilitate communications activities of control computer 202 with lighting fixture controllers. For example, wireless interface module 412 may package, address format, or otherwise prepare messages for transmission to and reception by particular controllers or zones. Wireless interface module 412 may also interpret, route, decode, or otherwise handle communications received at master transceiver 240 and communications interface 220.

Referring still to FIG. 4, user interface module 408 may include the software and other resources for the display of FIGS. 8-22 and the handling of automatic or user inputs received at the graphical user interfaces of control computer 202. While user interface module 408 is executing and receiving user input, user interface module 408 may interpret user input and cause various other modules, algorithms, routines, or sub-processes to be called, initiated, or otherwise affected. For example, control logic module 414 and/or a plurality of control sub-processes thereof may be called by user interface module 408 upon receiving certain user input events. User interface module 408 may also be configured to include server software (e.g., web server software, remote desktop software, etc.) configured to allow remote access to the screens shown in FIGS. 8-22. User interface module 408 may be configured to complete some of the control activities described herein rather than control logic module 414. In other embodiments, user interface module 408 merely drives the graphical user interfaces and handles user input/output events while control logic module 414 controls the majority of the actual control logic.

Control logic module 414 may be the primary logic module for control computer 202 and may be the main routine that calls, for example, modules 408, 410, etc. Control logic module 414 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 414 operates based off of information stored in one or more databases of control computer 202 and stored in memory 404 or another memory device in communication with control computer 202. The database may be populated with information based on user input received at graphical user interfaces (e.g., shown in FIGS. 8-22) and control logic module 414 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 414 as control logic module 414 proceeds through its various control algorithms.

Control logic module 414 may include any number of functions or sub-processes. For example, a scheduling sub-process of control logic module 414 may check at regular intervals to determine if an event is scheduled to take place. When events are determined to take place, the scheduling sub-process or another routine of control logic module 414 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 240. Control logic module 414 may also be configured to conduct or facilitate the completion of any other process, sub-process, or process steps conducted by control computer 202 described herein.

Referring further to FIG. 4, device interface module 410 facilitates the connection of one or more field devices, sensors, or other inputs not associated with master transceiver 240. For example, fieldbus interfaces 416 and 420 may be configured to communicate with any number of monitored devices 418 and 422. The communication may be according to a communications protocol which may be standard or proprietary and/or serial or parallel. Fieldbus interfaces 416, 420 can be or include circuit cards for connection to processing circuit 402, jacks or terminals for physically receiving connectors from wires coupling monitored devices 418, 422, logic circuitry or software for translating communications between processing circuit 402 and monitored devices 418, 422, or otherwise. In an exemplary embodiment, device interface module 410 handles and interprets data input from the monitored devices and controls the output activities of fieldbus interfaces 416, 420 to monitored devices 418, 422.

Fieldbus interfaces 416 and 420 and device interface module 410 may also be used in concert with user interface module 408 and control logic module 414 to provide control to the monitored devices 418, 422. For example, monitored devices 418, 422 may be mechanical devices configured to operate a motor, one or more electronic valves, one or more workstations, machinery stations, a solenoid or valve, or otherwise. Such devices may be assigned to zones similar to the lighting fixtures described above and below or controlled independently. User interface module 408 may allow schedules and conditions to be established for each of devices 418, 422 so that control computer 202 may be used as a comprehensive energy management system for a facility. For example, a motor that controls the movement of a spinning advertisement may be coupled to the power output or relays of a controller very similar if not identical to controller 300. This controller may be assigned to a zone (e.g., via user interfaces at touchscreen display 210) and provided a schedule for turning on and off during the day. In another embodiment, the electrical relays of the controller may be coupled to other building devices such as video monitors for informational display, exterior signs, task lighting, audio systems, or other electrically operated devices.

Referring further to FIG. 4, power monitor 450 is shown as coupled to fieldbus interfaces 416 in an exemplary embodiment. However, power monitor 450 may also or alternatively be coupled to its own controller or RF transceiver 451 for communicating with master transceiver 240. Power monitor 450 may generally be configured to couple to building power resources (e.g., building mains input, building power meter, etc.) and to receive or calculate an indication of power utilized by the building or a portion of the building. This input may be received in a variety of different ways according to varying embodiments. For example, power monitor 450 may include a current transformer (CT) configured to measure the current in the mains inlet to a building, may be coupled to or include a pulse monitor, may be configured to monitor voltage, or may monitor power in other ways. Power monitor 450 is intended to provide "real time" or "near real time" monitoring of power and to provide the result of such monitoring to control computer 202 for use or reporting. When used with power monitor 450, control logic module 414 may be configured to include logic that sheds loads (e.g., sends off signals to lighting fixtures via a lighting fixture controller network, sends off signals to monitored devices 418, 422, adjusts ambient light setpoints, adjusts schedules, shuts lights off according to a priority tier, etc.) to maintain a setpoint power meter level or threshold. In other exemplary embodiments, control logic module 414 may store or receive pricing information from a utility and shed loads if the metered power usage multiplied by the pricing rate is greater than certain absolute thresholds or tiered thresholds. For example, if daily energy cost is expected to exceed $500 for a building, control logic module 406 may be configured to change the ambient light setpoints for the lighting fixtures in the building until daily energy cost is expected to fall beneath $500. In an exemplary embodiment, user interface module 408 is configured to cause a screen to be displayed that allows a user to associate different zones or lighting fixtures with different demand/response priority levels. Accordingly, a utility provider or internal calculation determines that a load should be shed, control logic module 414 will check the zone or lighting fixture database to shed loads of the lowest priority first while leaving higher priority loads unaffected.

Figure 5A:
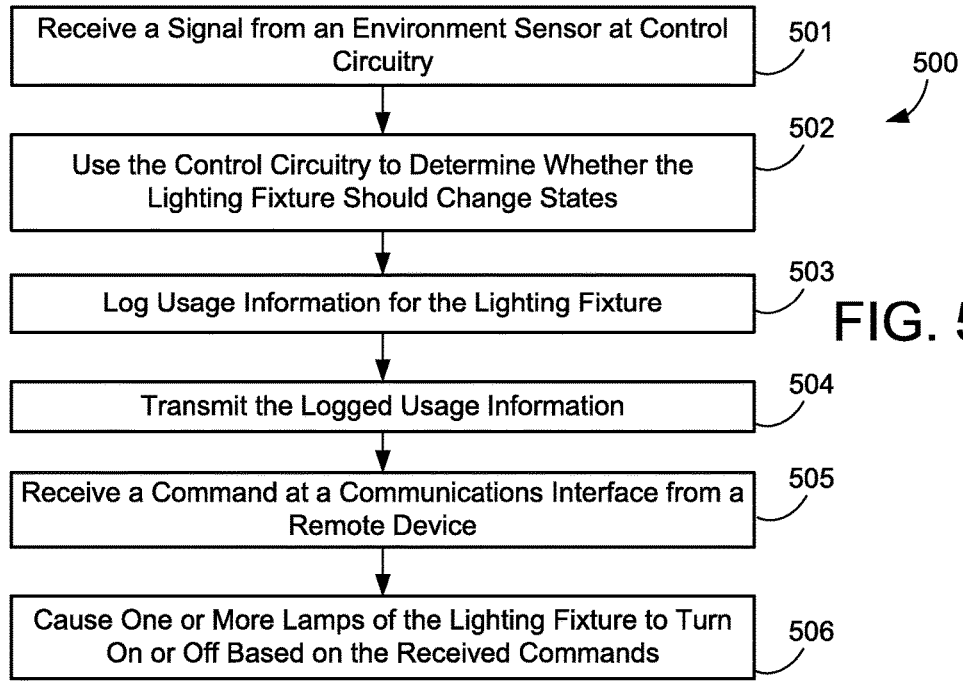
FIG. 5A is flow chart of a control process for controller 300, according to an exemplary embodiment.

Referring now to FIG. 5A, a flow chart of a process 500 for controller 300 is shown, according to an exemplary embodiment. Process 500 is shown to include receiving a signal from an environment sensor at control circuitry (e.g., sensor circuit 310, control circuit 304) (step 501). Process 500 further includes using the control circuitry to determine whether the lighting fixture should change states (step 502). Controller 300 is configured to log usage information for the lighting fixture when states are changed (step 503). As mentioned above, logging usage information may include tracking an aggregate "time on" for each ballast or lamp set of the lighting fixture. When a lamp or lamp set is replaced, controller 300 or control computer 202 may allow a user to "reset" logged usage information in whole or in part so that the logged usage information may be used for lamp maintenance prediction. For example, when controller 300 reports usage information to control computer 202, control logic module 414 of the control computer may examine the received usage information to determine whether a lamp or lamp set is near the end of its normal usage life. If a lamp or lamp set is determined to be at the end of its normal usage life, control logic module 414 may command user interface module 408 to cause a warning or other message or report to be displayed via touchscreen display 210.

Referring still to FIG. 5A, process 500 is further shown to include transmitting the logged usage information (step 504). Controller 300 may be configured to transmit the logged usage information back to control computer 202 for processing, archival, or action. In other embodiments, where the logged usage information includes an indication of an event (e.g., a message indicating "I have turned off due to adequate ambient light"), controller 300 may transmit the logged usage information for use by other controllers in its zone. Controller 300 may also be configured to receive a command from a remote device (e.g., control computer 200, another lighting fixture controller, a wireless router, etc.) (step 505) and to cause one or more lamps (e.g., lamp sets, ballasts, etc.) of the lighting fixture to turn on or off based on the received commands (step 506).

Figure 5B:
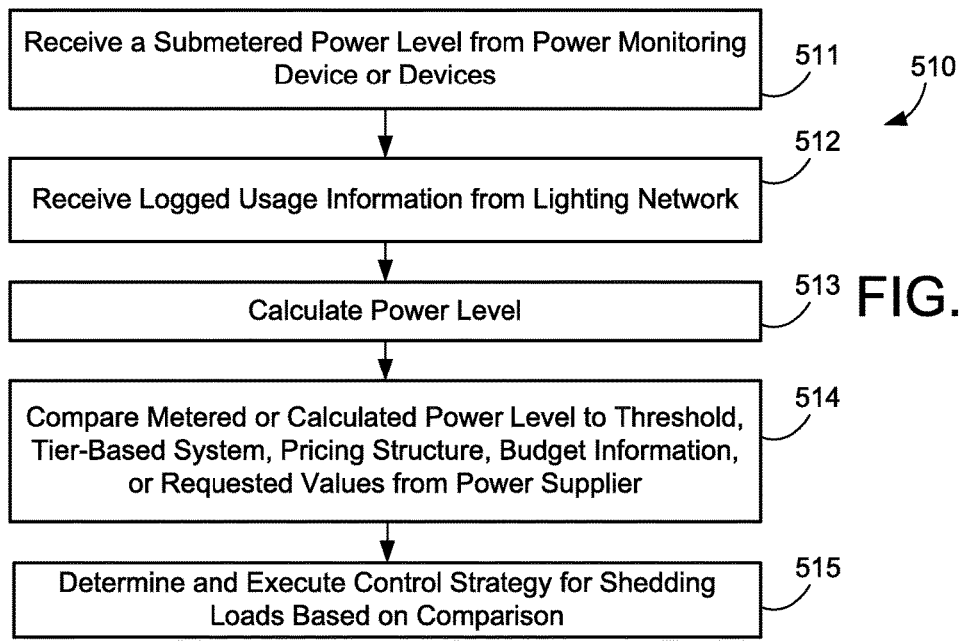
FIG. 5B is a flow chart of a process for control computer 202 shown in FIGS. 2B and 4, according to an exemplary embodiment.

Referring now to FIG. 5B, a flow chart of a process 510 for control computer 202 is shown, according to an exemplary embodiment. Process 510 is shown to include receiving a submetered power level (e.g., in the form of a data message) from a power monitoring device (e.g., power monitor 450) or devices (e.g., distributed metering devices) (step 511). Process 500 may further include receiving logged usage information from the lighting network (e.g., usage information logged as described above with respect to controller 300 or process 500) (step 512) and calculating the power level or power usage for the lighting network using the received usage information (step 513). Control computer 202 may be configured to output the calculated or received power level or usage information (e.g., via a display, via a website, via a report) or control computer 202 may be configured to take one or more actions based on the usage. For example, step 508 may include comparing the metered or calculated power level to a threshold, tiers of a tier-based system, pricing structure, budget information, or requested values from the power supplier (step 514). Based on the comparison, control computer 202 may determine and execute a control strategy for shedding loads (step 515). Various control strategies for shedding loads or demand-based control strategies are described in U.S. application Ser. No. 12/240,805, the entirety of which is incorporated by reference.

Referring now to FIG. 6, an exemplary control activity for a system of controllers as described herein is illustrated, according to an exemplary embodiment. As described in FIG. 2B, lighting fixtures (or more particularly controllers for lighting fixtures) can be grouped into zones. Rather than reporting motion, ambient light, or other sensed conditions back to master controller 240 for processing or action, controllers such as controller 300 may be configured to broadcast commands or conditions to other RF transceivers coupled to other controllers in the same zone. For example, in FIG. 6, lighting zone I includes four controllers. When motion is detected by sensor 112 of controller 300, logic module 314 and/or control circuit 304 causes wireless transceiver 306 to transmit an indication that motion was detected by the sensor. Accordingly, control circuits of the controllers receiving the indication can decide whether or not to act upon the indication of motion. The RF signals including an indication of motion may also include a zone identifier that receiving controllers can use to determine if the signal originated from their zone or another zone. In other exemplary embodiments, controller 300 may address messages to particular controllers (e.g., the addresses of neighbors or the addresses of other controllers in the zone). Logic module 314 may further be configured to cause the radio frequency transceiver to transmit commands to other radio frequency transceivers coupled to other fluorescent lighting fixtures. For example, logic module 314 and/or control circuit 304 may be configured to interpret a signal received at the radio frequency transceiver as indicating that motion was detected by another device in the zone. In an exemplary embodiment of the lighting fixture controller, some will be configurable as relay devices and when so configured, will relay any commands or information in the controller receives from other zone controllers. Controller 604 is illustrated to be configured as such a relay device. When controller 604 receives broadcast 600 indicating motion from controller 300, controller 604 relays broadcast 600 via transmission 602 to other zone devices (e.g., controller 606). This way, an event such as motion can be propagated to each of the lighting fixtures in a zone without network traffic to main controller 240 and/or without necessitating direct control of the lighting fixtures by main controller 240. This activity may be configurable (e.g., via a GUI provided by control computer 202) so that only some controllers are relays, all controllers are relays, or so that no controllers are relays and only devices within range of the detecting controller act on its broadcasts. Further, the relay or rebroadcast can be address-based or more similar to a true broadcast. For example, in an address-based relay, the controller serving as a relay may know the addresses of certain network controllers to which to transmit the relayed information. In another example, the broadcast may be general and not addressed to any particular controller, controllers, or zone.

To implement zone control activities, each controller may be configured to store a lighting zone value in memory (e.g., memory 316). This value may be used, for example, to determine whether another device sending a command is associated with the lighting zone value stored in memory. For example, controller 271 may include a lighting zone value of "II" in memory and controller 300 may include data representative of controller 300's lighting zone value (e.g., "I") with its transmission indicating that motion was detected. When controller 271 receives the lighting zone value, controller 271 (e.g., a control circuit or logic circuit thereof) may compare "I" and "II" and make a determination that controller 271 will not act on the received indication of motion (i.e., controller 271 leaves its relays off while all of the controllers in zone I switch their relays on.

Referring now to FIG. 7, a flow chart of a process 700 for controlling multiple lighting fixtures in a zone based on sensor input is shown, according to an exemplary embodiment. Process 700 is shown to include receiving signals from a sensor (e.g., sensor 212) coupled to a first controller for a first zone (step 702). Once received, circuitry of the first controller can determine whether the received signals represent an event that should be acted upon (e.g., by changing lighting states, etc.) in the first zone (step 704). Process 700 is further shown to include using circuitry of the first controller to transmit a command and/or an indication of the event with a first zone identifier (step 706). The transmission is received by a controller in a second zone. Circuitry of the controller in the second zone determines that the transmission is for another zone and does not act on the received transmission (step 708). The transmission may also be received by a second controller for the first zone (step 710). Circuitry of the second controller for the first zone inspects the received transmission and acts on the information of the transmission when the controller discovers that its stored zone identifier matches the received zone identifier (step 712). The second controller for the first zone may also be configured as a relay node and to retransmit the received command or indication to other first zone controllers (e.g., controller 606).

Control Configurations and Related Graphical User Interfaces of the Control Computer:

Referring now to FIGS. 8-22, a variety of graphical user interfaces (GUIs) that may be shown on an electronic display in communication with control computer 202 are shown, according to various exemplary embodiments.

Figure 8:
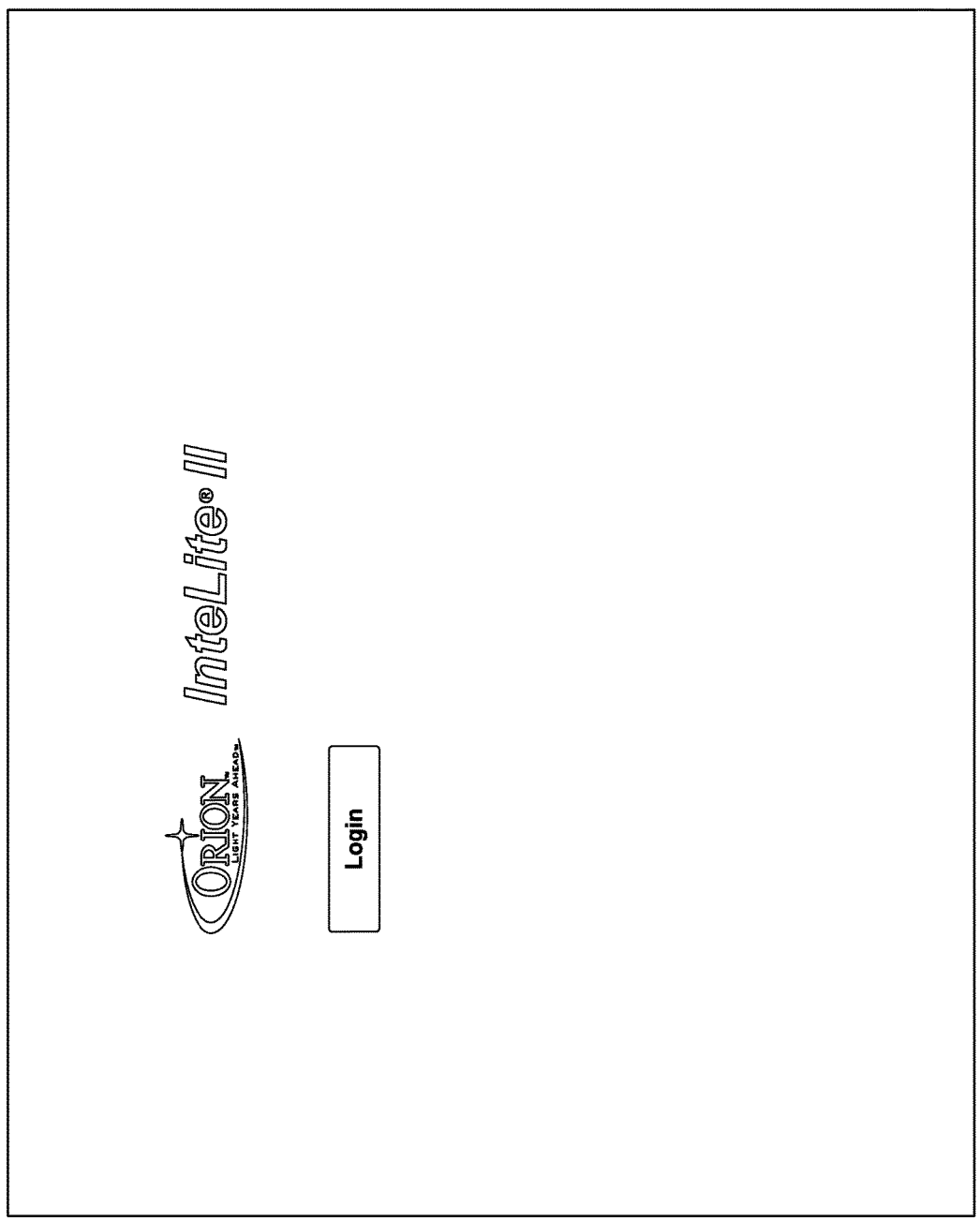
FIGS. 8-22 are illustrations of graphical user interface screens that may be caused to be displayed by control computer 202 shown in previous Figures for allowing user control of the lighting systems described herein, according to an exemplary embodiment.

FIG. 8 is an illustration of a login screen that may be provided to a display screen such as touchscreen display 210 by control computer 202, according to an exemplary embodiment. It should be appreciated that trademarks, markings, or information other than Orion and InteLite II may be shown on the login screen. By clicking on the login button, a user may be prompted for a password, username, or other credentials that the system checks to log the user into control computer 202.

Figure 9:
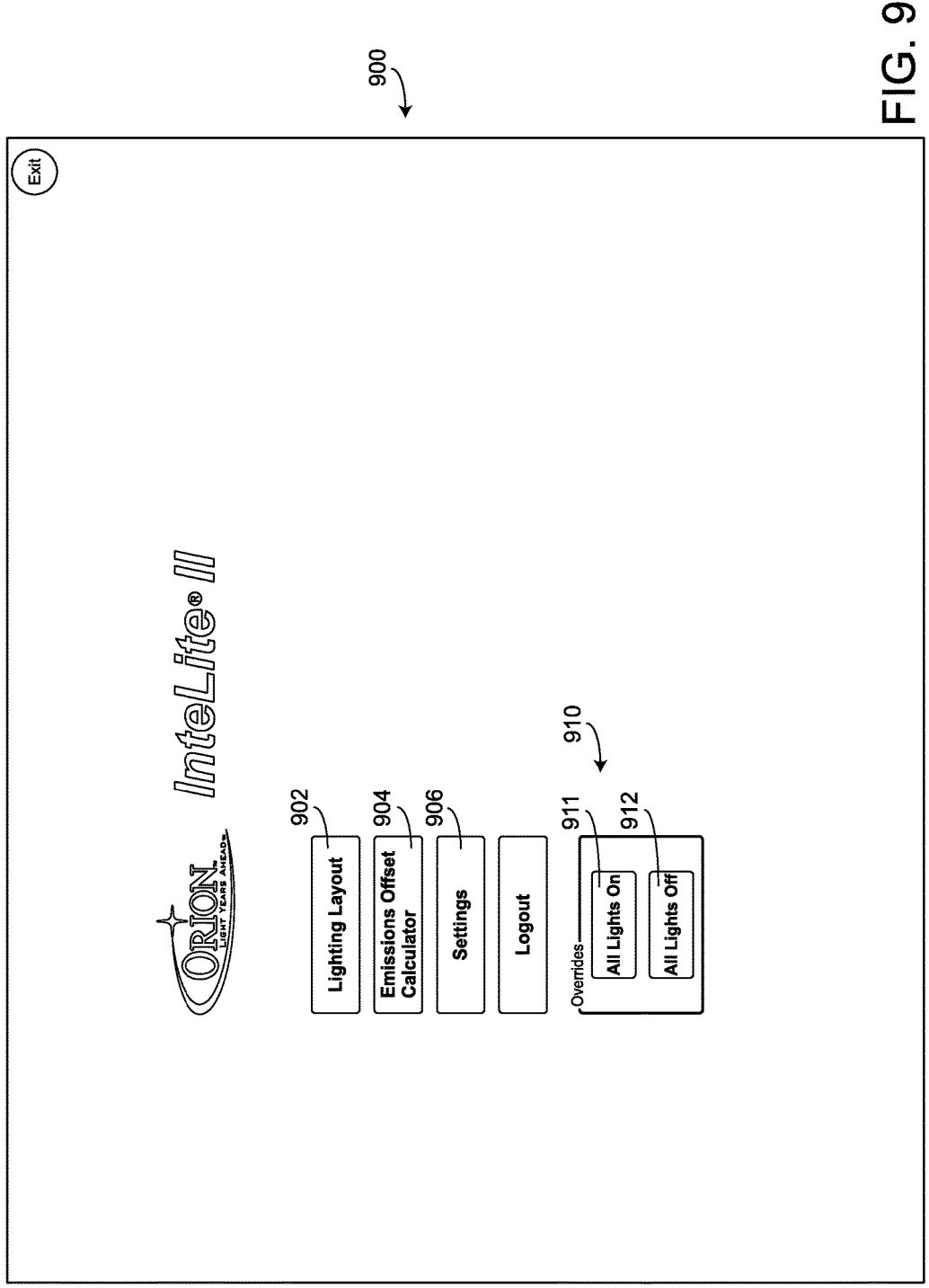

FIG. 9 is an illustration of a main menu screen 900 that may be provided to a display by control computer 202, according to an exemplary embodiment. At main menu screen 900, control computer 202 causes the screen to display buttons (which could be other UI elements such as hyperlinks) for launching a lighting layout (button 902) mode, launching an emissions offset calculator (button 904), and entering a setting mode (button 906). Main menu screen 900 can also include an override utility 910 including, for example, an all rights on button 911 and an all lights off button 912. Lighting layout modes or features are described in subsequent Figures (e.g., FIG. 10). The emissions offset calculator launched by button 904 may provide a screen or report that compares the power usage of the current lighting system compared to conventional or historical lighting systems. The power usage of the current lighting system may be calculated based on usage information from lighting fixture controllers or based on power meter readings from, for example, power monitor 450 shown in FIG. 4. The emissions offset calculator screen can show the results of aggregations or calculations that equate the power savings to cost savings, an equivalent amount of carbon credits, an equivalent emissions value, or another environmental values that quantifies the reduced financial and/or environmental impact due to the improved lighting system and/or control strategies at work in a facility when one or more of the features contained herein are implemented.

Figure 10:
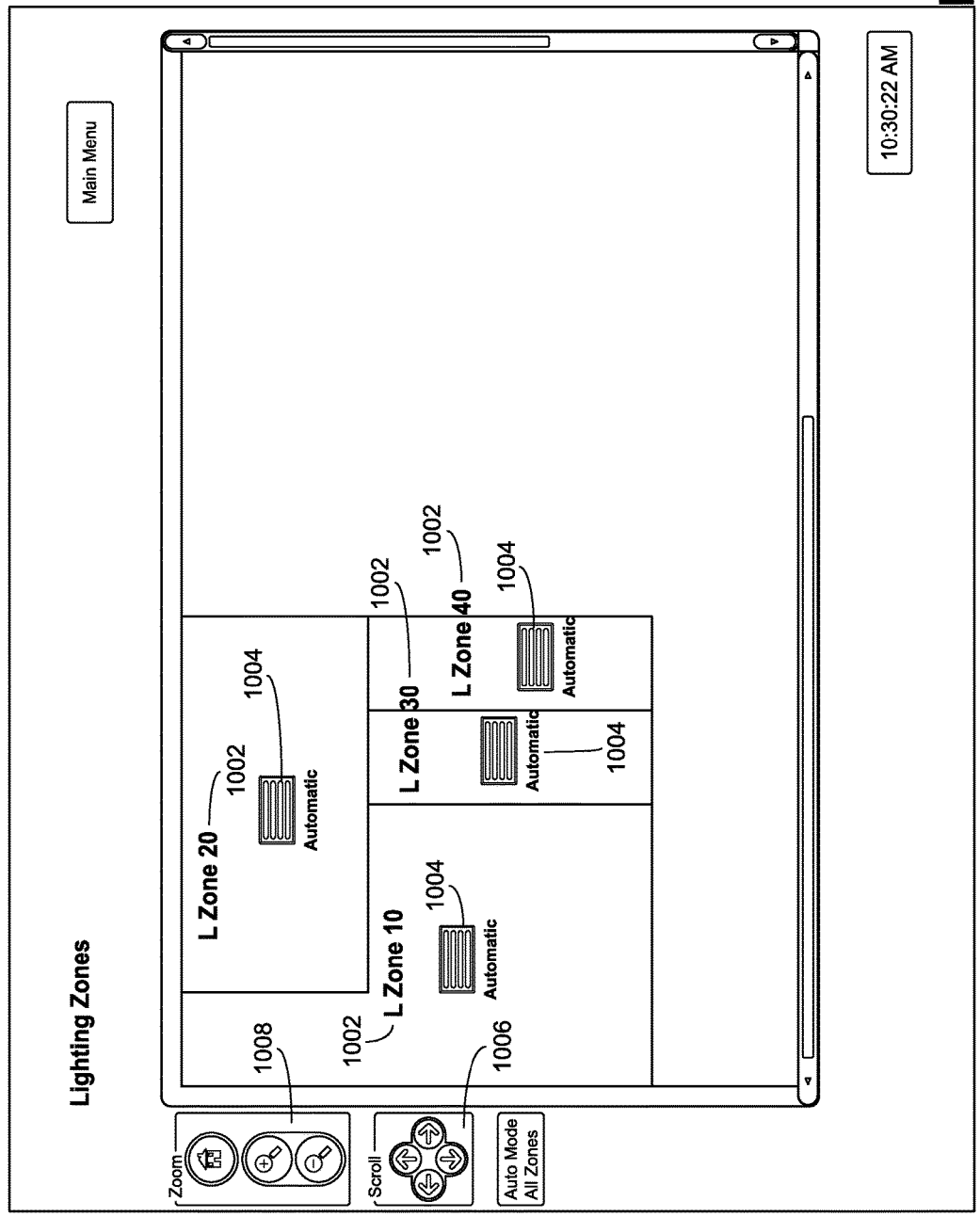

FIG. 10 is an illustration of a lighting layout or lighting zones screen 1000 that may be provided to a display by control computer 202 when button 902 of FIG. 9 is selected, according to an exemplary embodiment. Screen 1000 is shown to include a map (e.g., grid, layout, floor plan) including boundaries defining a plurality of lighting zones (labeled in screen 1000 as L Zone 10, L Zone 20, L Zone 30, and L Zone 40). In screen 1000, each zone is shown to include a zone identifier 1002 and a lighting fixture icon 1004. The lighting fixture icon 1004 can be located at a coordinate on the map corresponding to the actual geolocation for the lighting fixture. More than one lighting fixture icon 1004 may be associated with each zone and in some instances many (10+) lighting fixtures may be associated with any given zone depending on the application (e.g., warehousing, construction site, etc.). The left side of screen 1000 is shown to include GUI tools 1006 and 1008 for allowing a user to navigate around the map, lighting zones, and fixtures. For example, GUI tool 1006 allows for a user to click in a plurality of directions so that the map moves relative to the viewable window of screen 1000. GUI tool 1008 allows for a user to click in order to zoom in or zoom out. Further, a "home" button allows a user to return to a home screen or home view.

Figure 11:
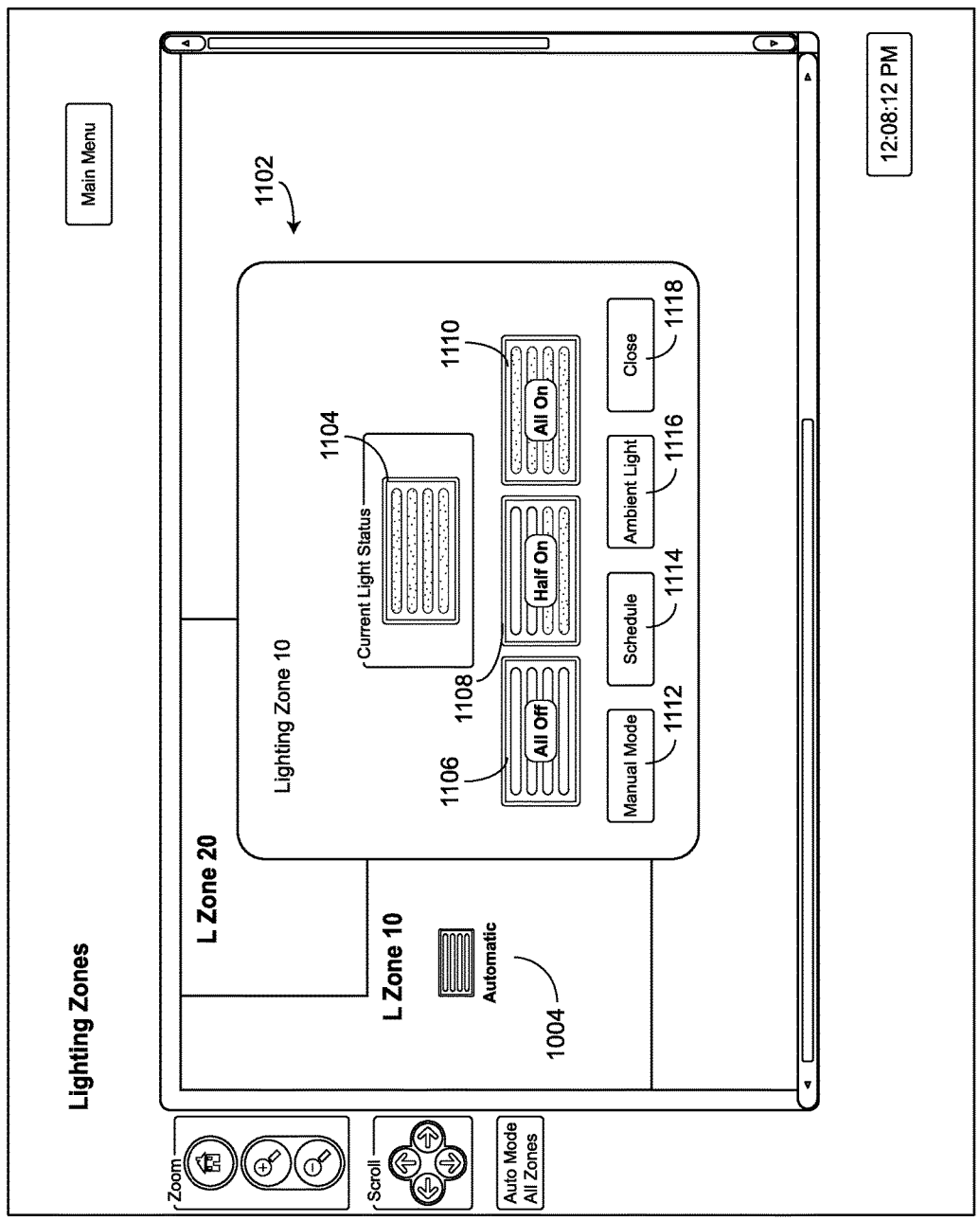

FIG. 11 is an illustration of lighting zones screen 1000 from FIG. 10, but including a lighting zone dialog box 1102 that may be provided to a display by control computer 202, according to an exemplary embodiment. Dialog box 1102 is displayed to a user when, for example, lighting fixture icon 1004 associated with a particular lighting zone is clicked or otherwise selected. Dialog box 1102 includes a current status indicator 1104 as well as controls 1106, 1108, and 1110 for changing the status of the lighting fixture. For example, current status indicator 1104 is illustrated to indicate that zone 10's lighting fixture is "all on." On a computer screen, this may be indicated by yellow lamps in the illustration of the lighting fixture rather than black lamps. In other embodiments, "on" may be indicated by a glow on top of the lighting fixture, a glow coming from behind the lighting fixture, an "ON" icon, text indicating the status (e.g., similar to that shown in controls 1106-1110, etc.), or otherwise. To change the status of the lighting fixture from "all on" to "all off" or "half on", the user can click control 1106 or 1108. With reference to previous Figures, when such a selection is made, control computer 202 may recognize the selection and cause a command for the appropriate lighting fixture controller (e.g., controller 300) to be broadcast from master transceiver 240 via RF communications. Making such a selection may place the lighting fixture into a manual mode of operation permanently or temporarily. In an exemplary embodiment, control computer 202 tracks and controls the mode of operation for each lighting fixture and/or each zone. If a zone is configured for other than manual operation and dialog box 1102 is used to change the state of a lighting fixture in the zone, the lighting fixture may maintain the user selected state for some period of time before returning to the state commanded by the mode of operation programmed to control the zone. For example, a zone may be configured to turn on or off according to a schedule which may be set or adjusted by clicking on button 1114. Control computer 202 may be configured to turn on or off based on ambient light sensed by, e.g., sensor 112 shown in previous Figures. Ambient lighting settings for the zone may be set or adjusted by clicking button 1116 on dialog box 1102. Closing the dialog box via button 1118 may cause computer 202 to save settings or changes made to the lighting zone. If manual mode button 1112 is clicked, control computer 202 may disable the schedule-based control, ambient lighting control, or other logic controls and cause the lighting zone to be controlled manually. Clicking manual mode 1112 may cause the lighting zone to be in a manual mode for the remainder of the day, for some longer or shorter period of time, or permanently (until again changed).

Figure 12:
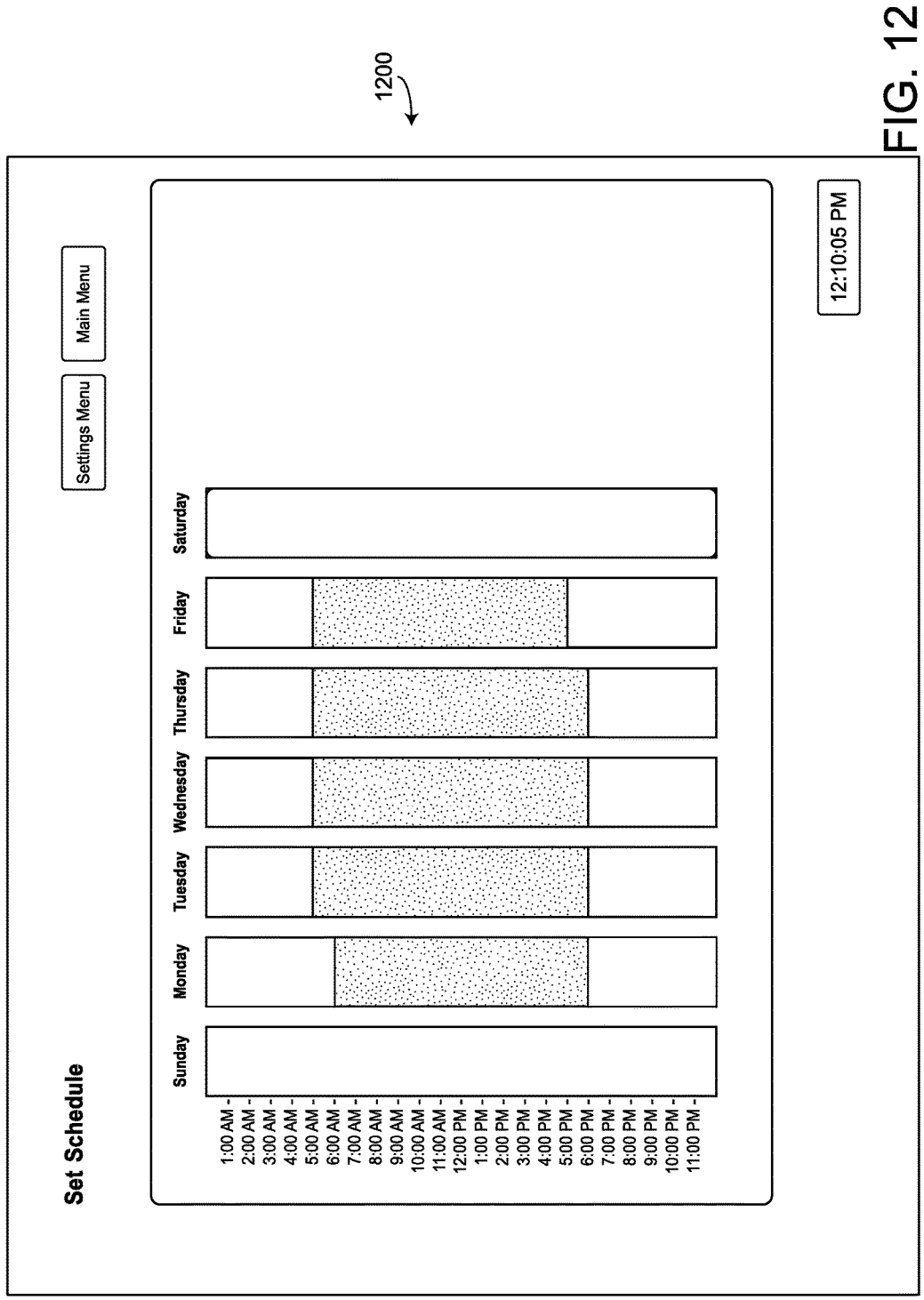

FIG. 12 is an illustration of a scheduling screen 1200 that may be provided to a display by control computer 202, according to an exemplary embodiment. Screen 1200 may be displayed, for example, when schedule button 1114 is selected from dialog box 1102. A slider control (or other GUI control) may be provided for each day of the week, allowing a user to select a period of time during any day of the week when the lights in a zone should be turned on and one or more periods of the day when the lights in a zone should be turned off. For example, in the illustration shown in FIG. 12, the lights for a zone are scheduled to be off all day on Sunday and Saturday while they are Scheduled to be on (indicating by the shading) during varying working hours during the week. Once a schedule is set for a zone, control computer 202 may send appropriate command signals to the lighting fixtures in the zone to cause the lighting fixtures in the zone to turn on or off according to the schedule.

Figure 13:
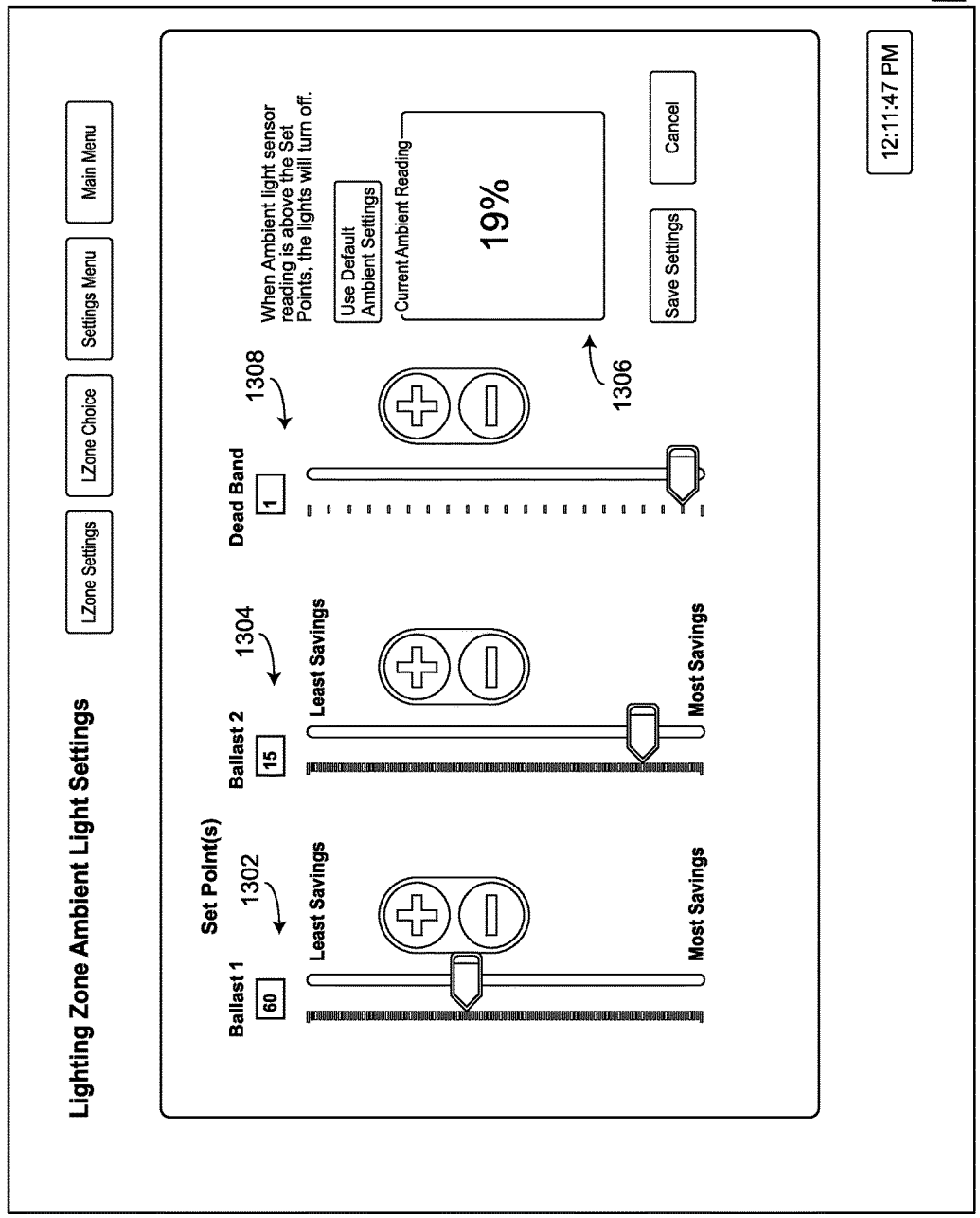

FIG. 13 is an illustration of a lighting zone ambient light setting screen 1300 that may be provided to a display by control computer 202, according to an exemplary embodiment. Screen 1300 may be displayed, for example, when button 1116 of dialog box 1102 is clicked. Screen 1300 is shown to include three slider controls (although in various exemplary embodiments, other types of controls may be used for level setting/selection) 1302, 1304, and 1308. Slider 1302 may be used to set an ambient lighting level for a first ballast (e.g., ballast 104 shown in FIG. 2A) of lighting fixtures in a zone, while slider 1304 may be used to set an ambient lighting level for a second ballast (e.g., ballast 106 shown in FIG. 2A) of the lighting fixtures in the zone. Control computer 202 may be configured to turn a ballast on or off depending on the current ambient reading for a fixture or zone relative to the set points selected via sliders 1302, 1304. For example, FIG. 13 illustrates that for the zone affected by screen 1300, ballast 1 requires a sixty percent or greater ambient light reading before control computer 202 will cause ballast 1 to turn off. On the other hand, ballast 2 only requires a fifteen percent or greater ambient light reading before control computer 202 will cause ballast 2 to turn off. Accordingly, three different levels of lighting (and energy use) may be set up via sliders 1302, 1304. That is: when ambient light levels are below fifteen percent, both ballasts will be controlled to be on; when ambient light levels are at or above fifteen percent but below sixty percent, only ballast 1 will be on; when ambient light levels are at or above sixty percent, both ballasts will be off and the space will be lit by natural light (e.g., coming through windows). Dead band slider 1308 may allow a user to adjust the responsiveness of the system by creating one or more dead band percentage points that a system may be able to stay within before causing the system to change states. That is, on a cloudy day where the ambient lighting level is fluctuating around fifteen percent, a dead band percentage of a few points may prevent the lighting fixtures from being commanded to oscillate. A user may track current ambient reading levels via display element 1306 and use the current level to assist in slider 1302, 1304 selections. Using screen 1300 for any given building zone, a user may be able to find an acceptable balance of artificial and natural light that will result in significant energy cost savings relative to an "all on" or ambient light independent control system while meeting illumination requirements for a space (e.g., footcandle requirements). Screen 1300 may also advantageously provide a user with the ability to provide a greater number of light intensity "steps" within a building which may advantageously improve occupant comfort. These settings may be compiled by controller 202 for zones, lighting fixtures within zones, or individual lighting fixtures and transmitted to the controllers for incorporation into the controllers' memory and/or control algorithms.

Figure 15:
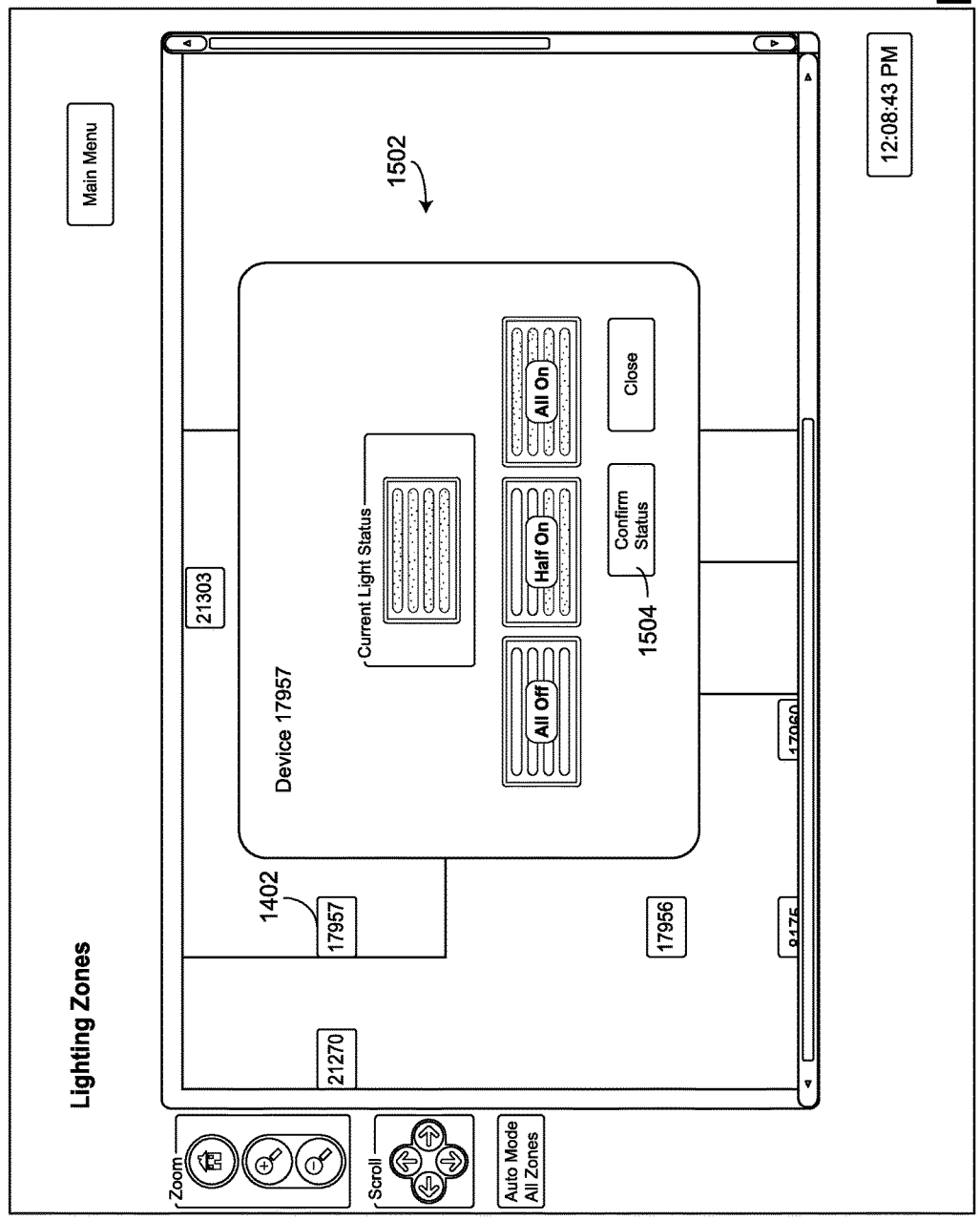

FIG. 14 is an illustration of a lighting zones detail screen 1400 that may be provided to a display by control computer 202, according to an exemplary embodiment. Lighting zones detail screen may be obtained by "zooming in" using controls 1008. Particularly, once zoomed in, a user may be provided an icon such as icon 1402 for each lighting fixture (rather than a single fixture icon representing the lights within a zone, as may be provided when "zoomed out" in some embodiments). Further an alpha-numerical identifier (or other identifier) for each lighting controller may be shown with each lighting fixture icon so that a manager of the building space can better identify each lighting fixture in the building or zone. For example, zone 1420 is shown to include at least three different lighting fixture controllers indicated by three different icons. Each lighting fixture icon (e.g., icon 1402) may be shaded a different color to indicate current status (e.g., all on, off, partially on, etc.). In other embodiments each lighting fixture icon may be shaded or otherwise identify the control setting for the lighting fixture (e.g., motion-based, ambient-light based, schedule-based control, demand-based control, manual control, automatic control, etc.). In some embodiments, each lighting fixture icon (e.g., icon 1402) is clickable or otherwise selectable such that a dialog box 1502 shown in screen 1500 of FIG. 15 is caused to be displayed by control computer 202. Dialog box 1502 is shown to identify the device and to include similar manual control options (e.g., all off, half on, all on) as shown above when controlling the entire zone. Button 1504 is shown as a "Confirm Status" button that, when pressed, causes control computer 202 to change the state of the particular device relating to dialog box 1502. Using this feature, a building manager can confirm that they are changing settings or otherwise correctly identifying the correct device.

Figure 16:
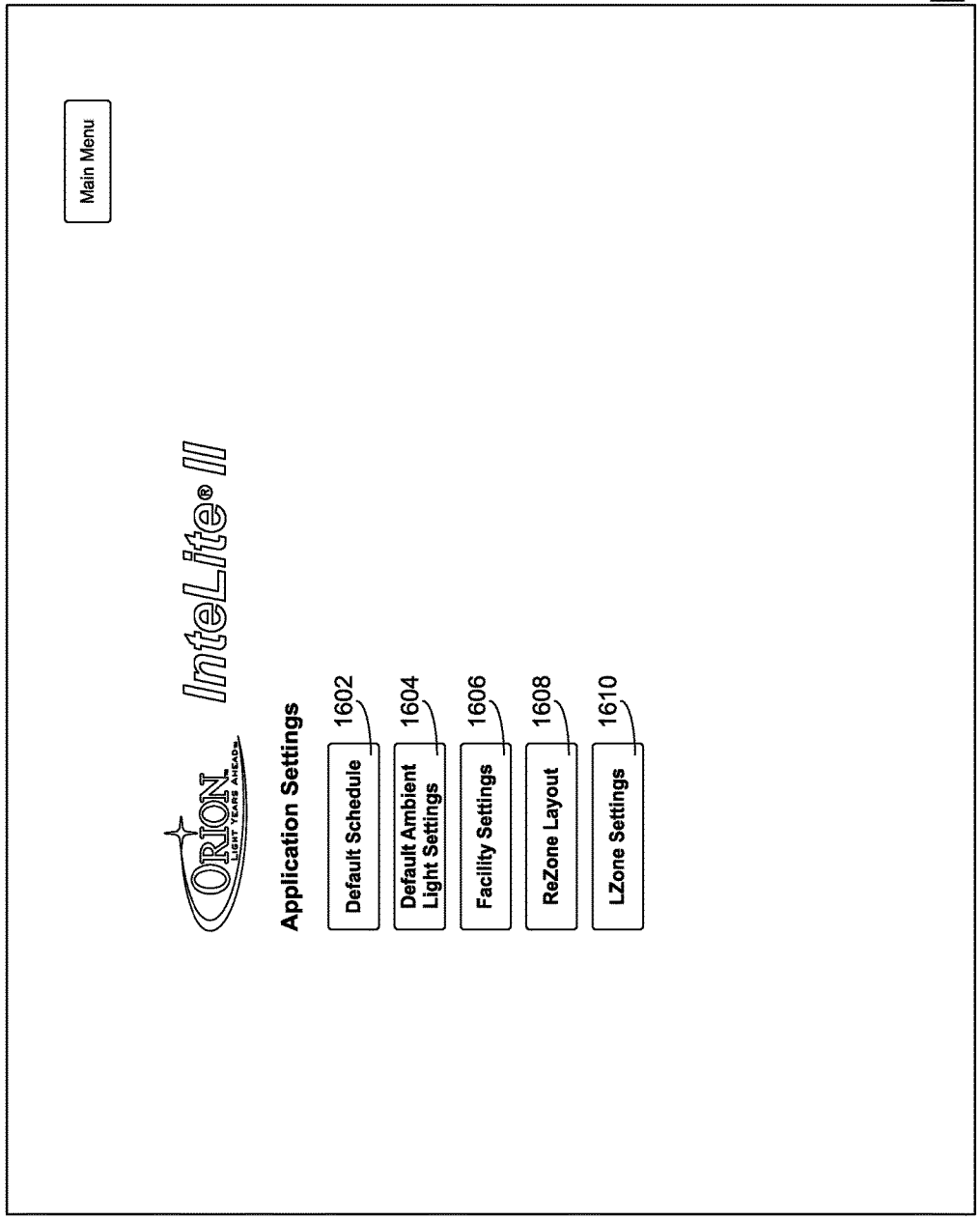

FIG. 16 is an illustration of an application settings screen 1600 that may be provided to a display by control computer 202, according to an exemplary embodiment. Screen 1600 is shown to include a default schedule button 1602, a default ambient light setting button 1604, a facility setting button 1606, a rezone layout button 1608, and a lighting zone setting button 1610. Default schedule button 1602 may cause a screen to be displayed that is similar to screen 1200 shown in FIG. 12. Entries made to the default schedule may serve as the base for zone or fixture specific edits. Default ambient light setting button 1604 may cause a screen to be displayed that is similar to screen 1300 shown in FIG. 13, however, rather than being applicable for one zone or lighting fixture, the screen triggered by default ambient light setting button 1604 may be applicable for all zones controlled by control computer 202. Facility setting button 1606 may be used to set any number of global variables that may affect the entire facility (e.g., whether to respond to demand-based control requests received from power providers, how frequently to poll controllers for logged usage information, etc.).

Figure 17:
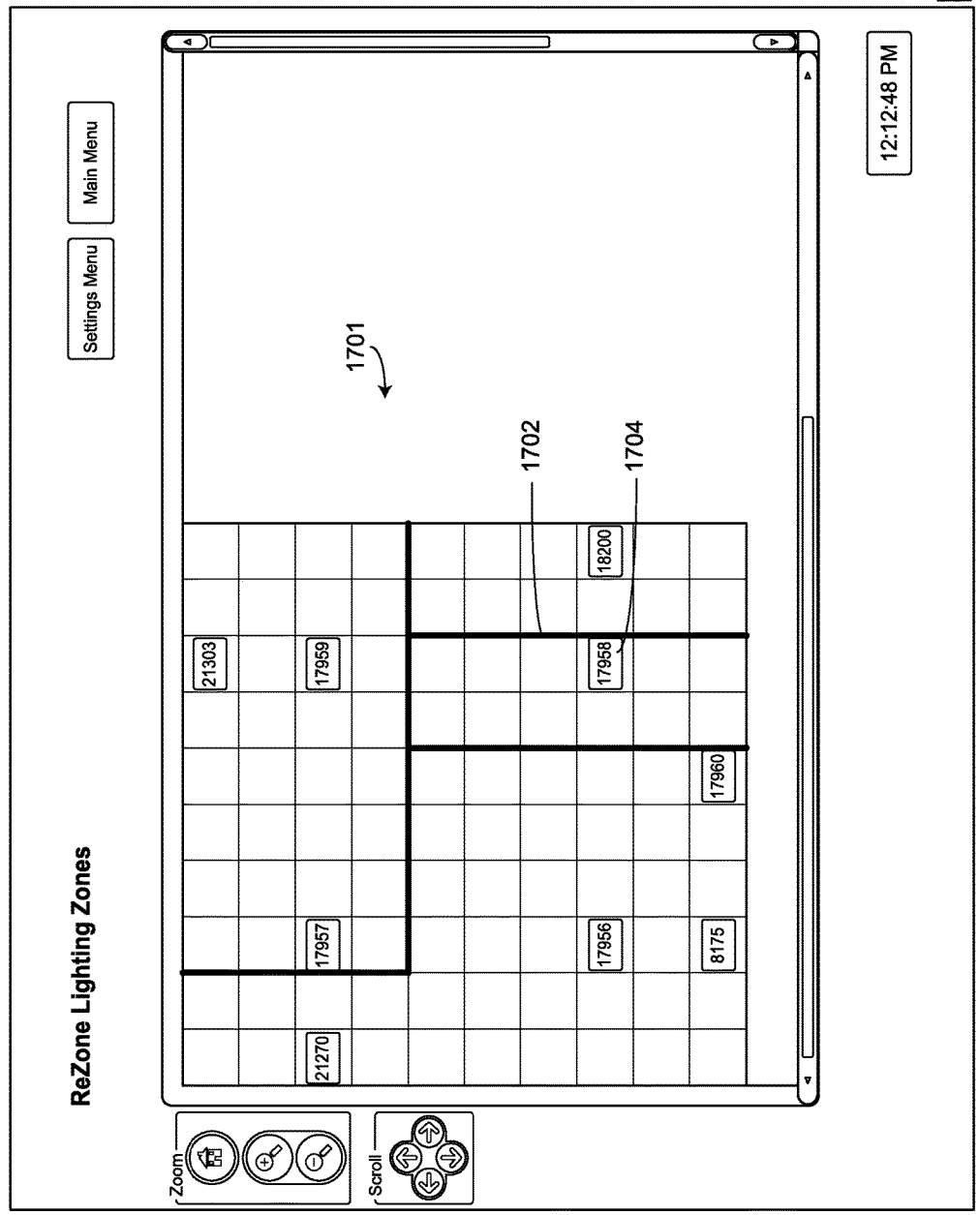
Figure 18:
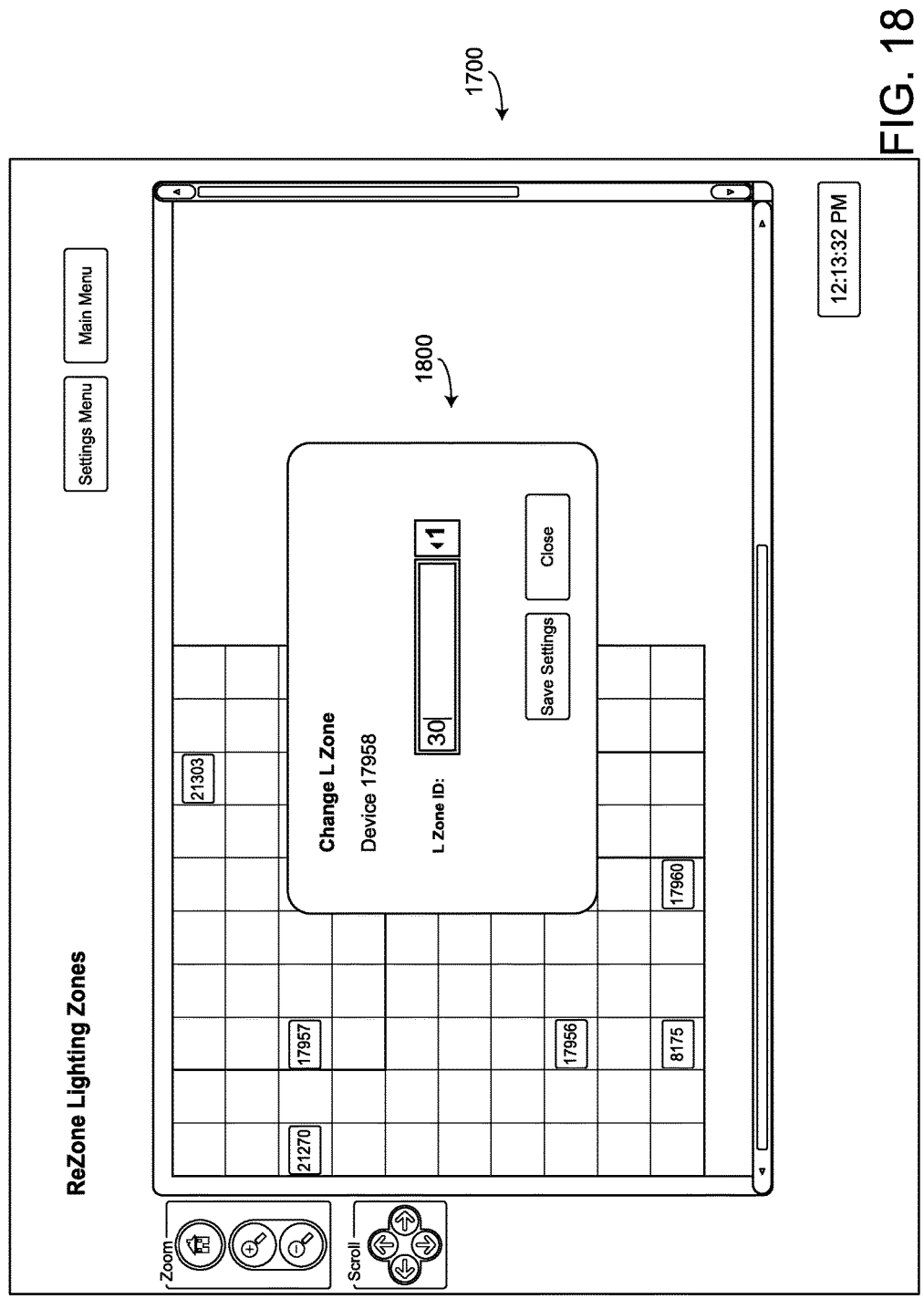

FIG. 17 is an illustration of a change settings screen 1700 that may be provided to a display by control computer 202, according to an exemplary embodiment. Screen 1700 may be shown to a user when button 1608 is clicked. Screen 1700 may generally be used to change zone boundaries, to move lighting fixture icons from zone to zone, to remove lighting fixtures from a zone, or otherwise. Zone boundaries may be edited by, for example, dragging boundaries such as boundary 1702 on a displayed grid. Lighting fixtures may be moved by, for example, clicking and dragging a lighting fixture. A dialog box may be used to reassign a lighting fixture to a different zone when a lighting fixture icon (e.g., icon 1704) is clicked or otherwise selected. For example, in dialog box 1800 shown in FIG. 18, device 17958 associated with icon 1704 is being reassigned to lighting zone 30 (i.e., the L Zone ID stored in device 17958 will change to 30 once "Save Settings" is pressed).

Figure 19:
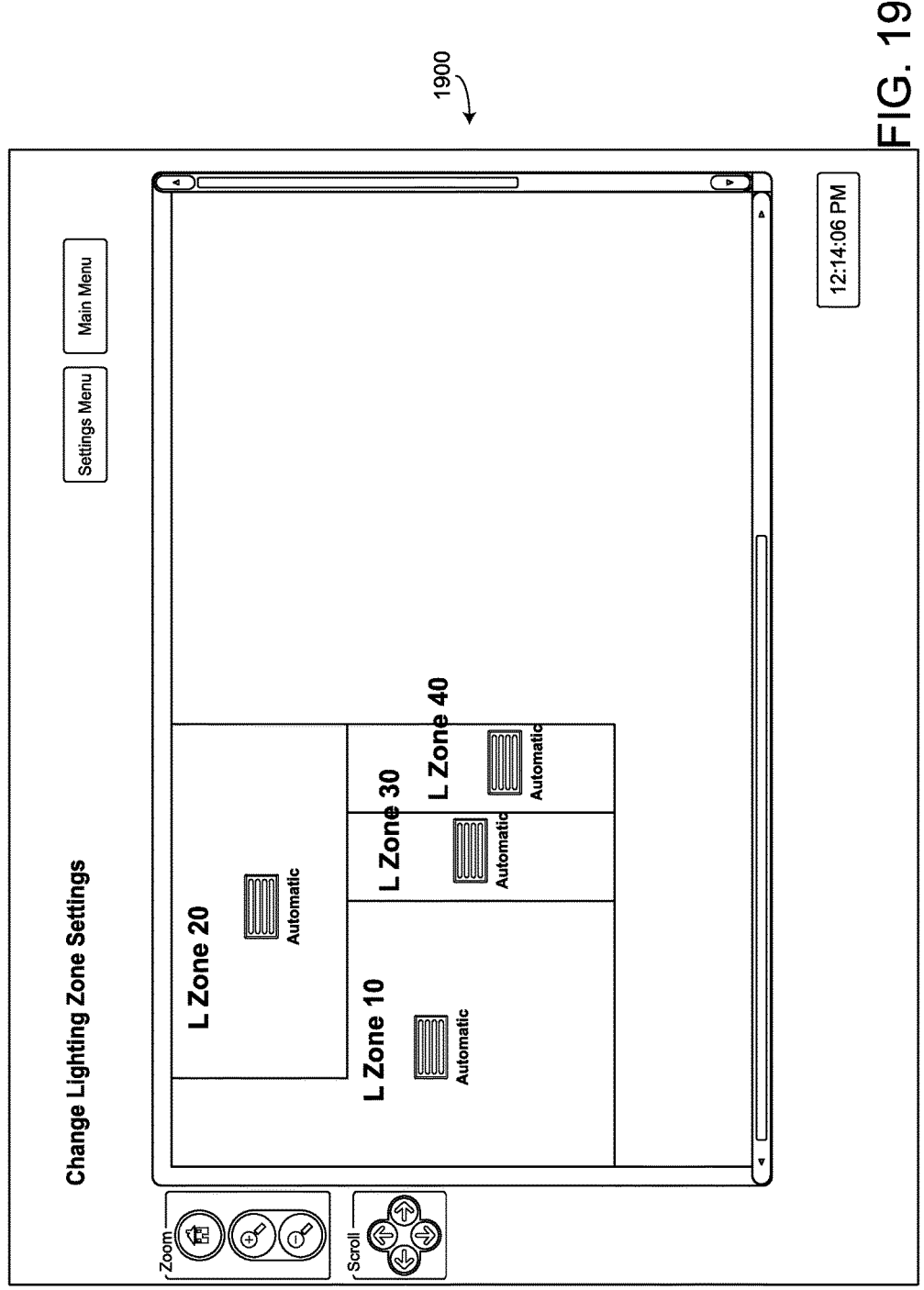
Figure 20:
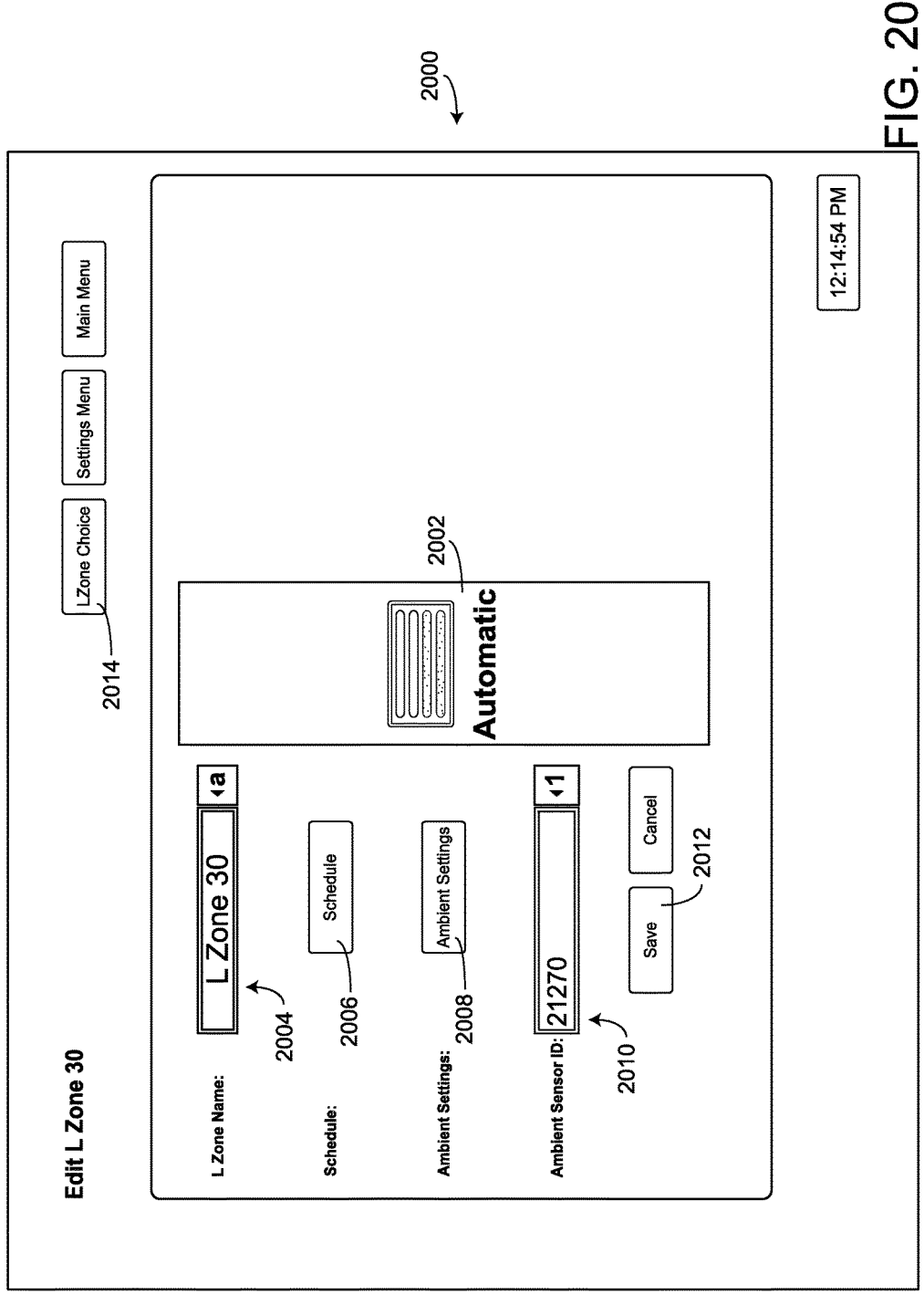

FIG. 19 is an illustration of a lighting zone setting screen 1900 may be provided to a display by control computer 202, according to an exemplary embodiment. When a user selects a zone for changing the settings of (e.g., by clicking an the lighting fixture icon associated with the zone, by clicking the zone title, etc.), screen 2000 shown in FIG. 20 may be displayed. For example, in screen 2000, a user has selected L Zone 30 as the zone to edit. The identifier for the zone (i.e., L Zone Name) may be changed via text box 2004, the default schedule for the zone may be changed via schedule button 2006, the ambient lighting settings for the zone may be changed via button 2008, and an ambient sensor id may be set via box 2010. Changes to the lighting zone may be saved via button 2012. Whether the zone is generally in automatic mode or manual mode may be changed via button 2002. In some embodiments only one ambient sensor may be used to provide ambient light readings to an entire zone.

In such instances, an entire zone may be assigned to an identifier of the chosen ambient sensor. This assignment or relationship information may be propagated out to the individual controllers and/or stored in a database of memory 404 and acted on by control computer 202. In instances where a zone includes devices other than lighting fixtures coupled to wireless controllers, associating a sensor with such a zone will cause control computer 202 to communicate to the controller for the sensor that the sensor readings should be communicated back to the master controller rather than merely acted upon locally (e.g., controller to controller). When control computer 202 receives sensor readings from a zone sensor, control computer (e.g., the control logic module thereof) sends commands appropriate for the sensor readings to the other devices.

Figure 21:
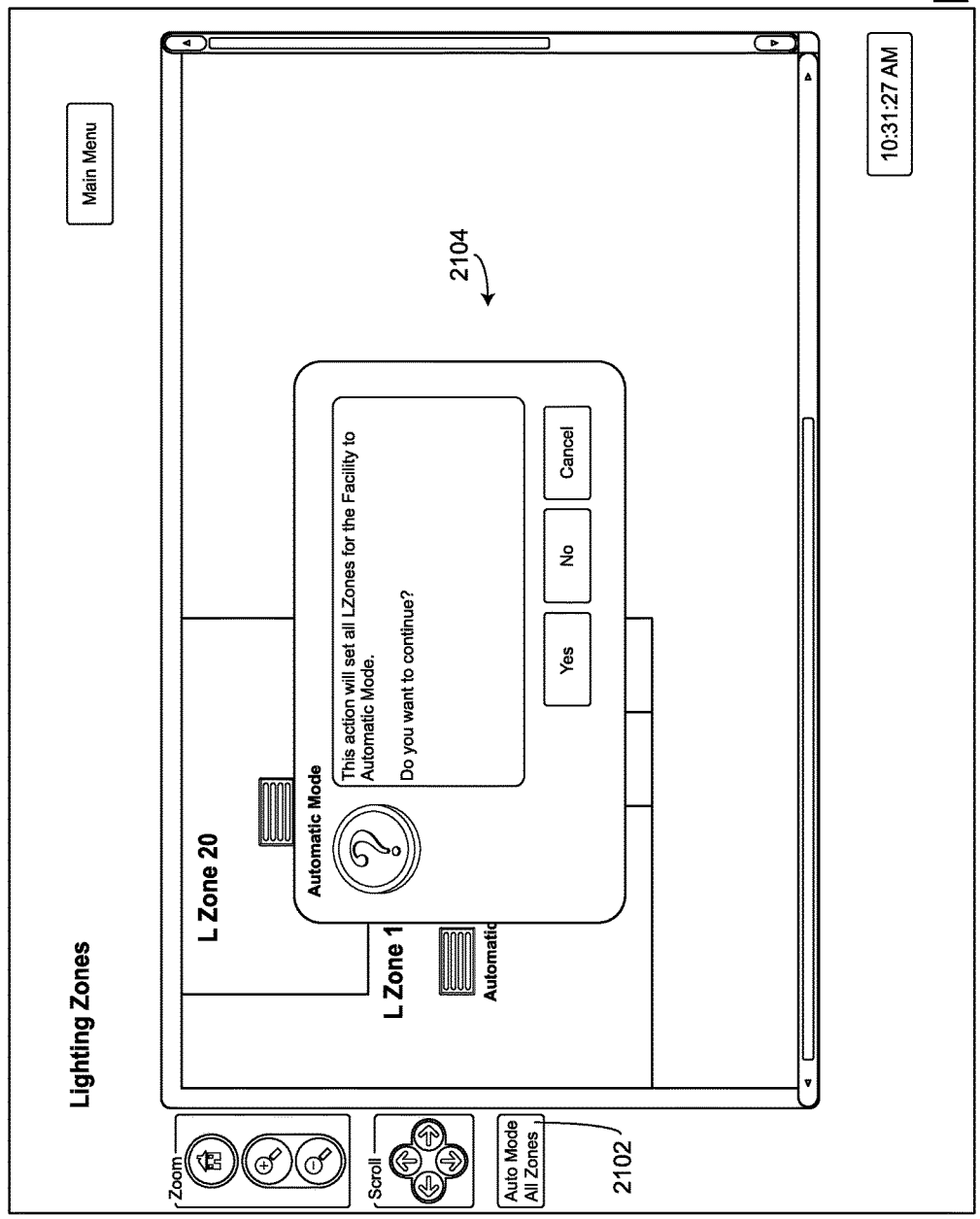

FIG. 21 is an illustration of an automatic mode screen 2100 including automatic mode dialog box 2104 that may be provided to a display by control computer 202, according to an exemplary embodiment. Automatic mode dialog box 2104 may be caused to be displayed by control computer 202 upon a user clicking an "auto mode" button such as button 2102. Automatic mode may cause all of the lights to use their motion, ambient light, or schedule-based controls rather than rely on manual actuation. Automatic mode may be utilized unless a fixture or zone is "brought out" of manual mode by user command.

Figure 22:
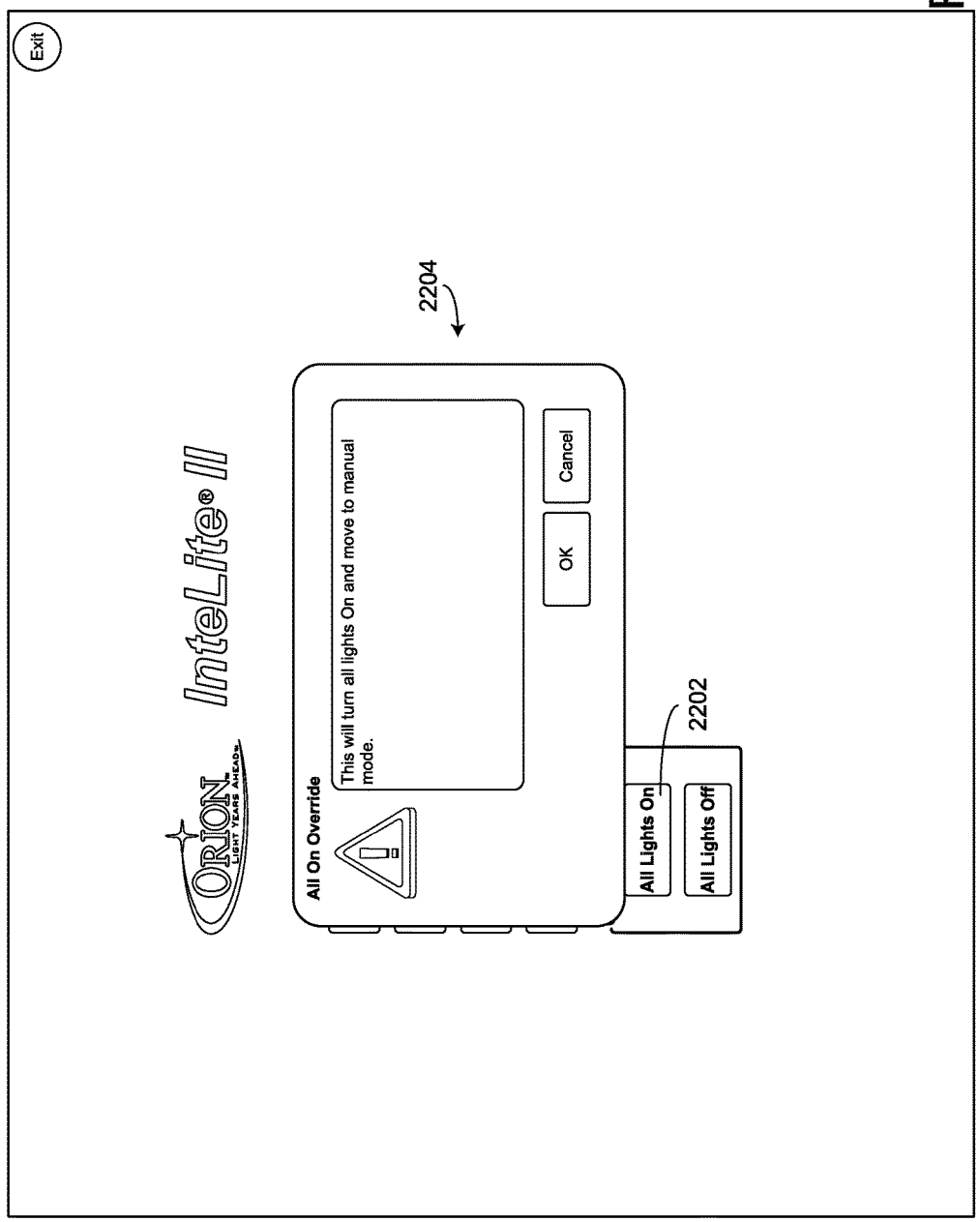

FIG. 22 is an illustration of an override mode screen 2200 including override mode dialog box 2204 that may be provided to a display by control computer 202, according to an exemplary embodiment. Override mode dialog box 2204 may be caused to be displayed by control computer 202 upon a user clicking an "all lights on" button such as button 2202. Override or manual mode may cause the lighting fixture controllers and control computer 202 to temporarily or permanently ignore other control scheme settings such as motion control, schedule control, and the like. Override mode may be on a timer, expire at the end of the day, or may be permanent until the user selects one or more automatic mode features for lighting fixtures or zones of the system.

Various Exemplary Embodiments:

It should be noted that the screens shown in FIGS. 8-22 are exemplary only and may vary depending on the control computer, intended display device, user preference, or otherwise. One or more functions may be combined onto a few number of screens or expanded onto a greater number of screens. Aspects shown and described as being within dialog boxes may be options or controls shown on main screens, "next" screens in a sequence of screens, or otherwise. Items referred to as buttons may be any clickable, selectable, or otherwise interactive controls for facilitating the user interface features described. In yet other embodiments audio (e.g., via speakers integrated with control computer 202, via an external audio system coupled to control computer 202, etc.) may be used for prompting the user for input and/or for receiving input from a user (e.g., via a microphone and voice recognition circuit/module). Further, other user input mechanisms of the past, present or future may be provided to the systems described above to provide the features discussed throughout the present application or with particular reference to FIGS. 8-22.

Further, the construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A lighting fixture system comprising:
one or more light sources configured to receive controlled power; and
a controller wired to the lighting fixture, the controller comprising:
one or more relays configured to turn power provided to the one or more light sources on and off such that the one or more light sources turn on and off with the switching of the one or more relays;
a logic circuit configured to control the switching of the one or more relays, wherein based on the logic circuit controlling the switching of the one or more relays, the logic circuit is configured to log usage information for the lighting fixture in memory, the logged usage information indicating the switching of the one or more relays; and communications electronics configured to output the logged usage information.

2. The lighting fixture system of claim 1, wherein the controller further comprises a sensor, and wherein the logic circuit is further configured to control the switching of the one or more relays based on inputs received from the sensor.

3. The lighting fixture system of claim 2, wherein the sensor is a motion sensor.

4. The lighting fixture system of claim 3, wherein the logic circuit is further configured to discontinue the switching based on the inputs received from the sensor by analyzing behavior of at least one of the sensor, the switching, and the logged usage information.

5. The lighting fixture system of claim 2, wherein the logic circuit is further configured to discontinue the switching based on a determination that switching based on the inputs from the sensor has occurred too frequently.

6. A system for controlling lighting in a building, the system comprising:
a plurality of lighting fixtures;
electronics coupled to the plurality of lighting fixtures and configured to:
control local on/off switching of light sources for the plurality of lighting fixtures,
based on controlling the local on/off switching of the light sources, log usage information for the plurality of lighting fixtures, the usage information indicating the local on/off switching of the light sources, and
retain a zone identifier for each of the plurality of lighting fixtures; and
a computing system configured to:
receive the usage information,
calculate energy use information for the plurality of lighting fixtures by aggregating the usage information for the plurality of lighting fixtures, and
cause the calculated energy use information to be displayed on an electronic display in communication with the computing system.

7. The system of claim 6, wherein the computing system is further configured to generate a graphical user interface for controlling the plurality of lighting fixtures via a touch screen interface.

8. The system of claim 7, wherein the graphical user interface is configured to include a user control configured to override previous settings for the plurality of lighting fixtures.

9. The system of claim 8, wherein the computing system is further configured to use input received at the touch screen interface to configure settings for the plurality of lighting fixtures.

10. A device for controlling a lighting fixture, comprising:
a control circuit configured to cause one or more light sources of the lighting fixture to turn on and off;
a sensor;
a logic circuit configured to:
receive a signal from the sensor, and
use the signal to determine whether the control circuit should change states; and
a radio frequency transceiver configured to receive commands via radio frequency communications;
wherein the control circuit is further configured to cause the one or more light sources of the lighting fixture to turn on and off based on the received commands;
wherein the logic circuit is further configured to log usage information for the lighting fixture, the logged usage information indicating that the one or more light sources was turned on or off based on the received commands;
and wherein the radio frequency transceiver is further configured to transmit the logged usage information.

11. The device of claim 10, wherein the sensor is at least one of an infrared sensor and an optical sensor.

12. The device of claim 10, wherein the logic circuit is further configured to:
use the signal from the sensor to detect motion, and
determine whether the control circuit should change states based on the detected motion.

13. The device of claim 12, wherein the logic circuit is further configured to use the signal from the sensor to determine an ambient lighting level.

14. The device of claim 13, wherein the logic circuit is further configured to determine whether the control circuit should change states based on the ambient lighting level.

15. The device of claim 14, wherein the logic circuit is further configured to provide an additional command to the control circuit, and wherein the control circuit is further configured to cause the one or more light sources of the lighting fixture to turn on or off based on the additional command received from the logic circuit.

16. The device of claim 15, wherein the additional command causes the control circuit to turn on the one or more light sources of the lighting fixture when the logic circuit detects motion via the signal from the sensor and when the logic circuit determines that the ambient lighting level is below a threshold setpoint.

17. The device of claim 16, wherein the logic circuit is further configured to prevent on/off cycling of the one or more light sources of the lighting fixture by holding the one or more light sources in an "on" state for a predefined period of time after a condition that caused the one or more light sources to turn on is no longer true.

18. The device of claim 17, wherein the logic circuit is further configured to include a restrike violation module configured to prevent the logic circuit from commanding the control circuit to cause the one or more light sources to turn on while a restrike time is counted down.

19. The device of claim 10, wherein the logic circuit is further configured to cause the radio frequency transceiver to transmit additional commands to other radio frequency transceivers coupled to other lighting fixtures.

20. The device of claim 19, wherein the logic circuit is further configured to cause the radio frequency transceiver to transmit an indication that motion was detected by the sensor.

* * * * *